(12) United States Patent
Barnhill

(10) Patent No.: US 9,370,142 B2
(45) Date of Patent: Jun. 21, 2016

(54) REMOTE-CONTROLLED VERTICAL ASCENDING AND DESCENDING WORKSTATION

(76) Inventor: Thomas K. Barnhill, Surprise, AZ (US)

( * ) Notice: Subject to any disclaimer, the term of this patent is extended or adjusted under 35 U.S.C. 154(b) by 0 days.

(21) Appl. No.: 13/535,137

(22) Filed: Jun. 27, 2012

(65) Prior Publication Data

US 2014/0000982 A1 Jan. 2, 2014

(51) Int. Cl.
| | | |
|---|---|---|
| *B66B 9/00* | (2006.01) | |
| *A01G 23/095* | (2006.01) | |
| *A01G 3/08* | (2006.01) | |
| *F03D 1/00* | (2006.01) | |

(52) U.S. Cl.
CPC .............. *A01G 23/0955* (2013.01); *B66B 9/00* (2013.01); *A01G 3/08* (2013.01); *F03D 1/003* (2013.01)

(58) Field of Classification Search
CPC .......... B66B 9/00; B66C 1/108; E04G 3/243; E04G 3/28; E04G 3/24; F03D 1/003; A01G 23/0955; A01G 23/08; A01G 23/095; A01G 3/08; A63B 27/00; A63B 27/02; A63B 27/04; B27L 1/06; F05B 2204/915
USPC .......................................... 182/133, 141, 187
See application file for complete search history.

(56) References Cited

U.S. PATENT DOCUMENTS

| | | | | |
|---|---|---|---|---|
| 860,359 | A * | 7/1907 | Dudley .......................... | 182/133 |
| 2,477,922 | A * | 8/1949 | Emery et al. ................. | 144/208.8 |
| 2,482,392 | A * | 9/1949 | Whitaker ..................... | 47/1.01 R |
| 2,541,767 | A * | 2/1951 | Jones .......................... | 47/1.01 R |
| 2,581,479 | A * | 1/1952 | Grasham ..................... | 47/1.01 R |
| 2,727,335 | A * | 12/1955 | Susil ........................... | 47/1.01 R |
| 3,030,986 | A * | 4/1962 | Longert ....................... | 144/24.13 |
| 3,181,578 | A * | 5/1965 | Longert ....................... | 144/24.13 |
| 3,504,767 | A * | 4/1970 | Sherman ...................... | 182/136 |
| 3,520,383 | A * | 7/1970 | Loock ........................... | 182/133 |
| 3,586,127 | A * | 6/1971 | Jones ............................ | 182/133 |
| 4,624,293 | A * | 11/1986 | Suezaki ...................... | 144/24.13 |
| 4,766,939 | A * | 8/1988 | Forslund .................... | 144/24.13 |

(Continued)

OTHER PUBLICATIONS definition of "pulley" found in the Action The American Heritage® Dictionary of the English Language, Fourth Edition copyright ©2000 by Houghton Mifflin Company. Updated in 2009. Published by Houghton Mifflin Company. All rights reserved.*

(Continued)

*Primary Examiner* — Daniel Cahn
(74) *Attorney, Agent, or Firm* — Schmeiser, Olsen & Watts LLP

(57) ABSTRACT

An apparatus designed for climbing poles, trees and other such columnar objects. The apparatus is a remote-controlled work station that provides a scaffold for mounting semi-robotic articulated arms and video cameras. The articulated arm has a quick-release coupler on an end thereof that is able to repeatedly and releasably couple attachments thereto, such as saws, blades, and other pruning objects. The device includes an expandable frame that may be opened and closed to fit around the vertical structure to be climbed. The frame has horizontal and vertical supports, drive system compression supports, and wheels. A drive system is mounted to each of the drive system compression supports. The drive system includes motorized tracked-climbers that are maintained in contact with the vertical structure to be climbed via adjustable independent suspension. The suspension uses adjustable spring shocks and drive system slide rails to connect the frame to the drive system.

15 Claims, 23 Drawing Sheets

(56) References Cited

U.S. PATENT DOCUMENTS

| | | | | |
|---|---|---|---|---|
| 6,079,517 | A * | 6/2000 | Payne | 182/187 |
| 6,619,432 | B1 * | 9/2003 | Yasui | 187/250 |
| 6,672,346 | B1 * | 1/2004 | Heckmaier | 144/24.13 |
| 7,882,864 | B2 * | 2/2011 | Fargeot | 144/4.1 |
| 7,997,311 | B2 * | 8/2011 | Prout, Jr. | 144/208.2 |
| 8,307,865 | B1 * | 11/2012 | Cuffel | 144/24.1 |
| 8,517,066 | B1 * | 8/2013 | Van De Mortel et al. | 144/24.13 |
| 2006/0130933 | A1 * | 6/2006 | Smith et al. | 144/208.2 |
| 2007/0181217 | A1 * | 8/2007 | Ahdoot | 144/208.2 |
| 2008/0105491 | A1 * | 5/2008 | Prout | 182/133 |
| 2008/0203246 | A1 * | 8/2008 | Ingram et al. | 248/74.1 |
| 2009/0277536 | A1 * | 11/2009 | Scott | 144/24.13 |
| 2011/0318496 | A1 * | 12/2011 | Jensen et al. | 427/427.3 |
| 2013/0228397 | A1 * | 9/2013 | Horn | 182/141 |
| 2013/0284869 | A1 * | 10/2013 | Helenius | 248/218.4 |

OTHER PUBLICATIONS definition of "track" found in the Action The American Heritage® Dictionary of the English Language, Fourth Edition copyright © 2000 by Houghton Mifflin Company. Updated in 2009. Published by Houghton Mifflin Company. All rights reserved.* definition of 'rapid' provided in Action "Random House Kernerman Webster's College Dictionary, © 2010 K Dictionaries Ltd. Copyright 2005, 1997, 1991 by Random House, Inc. All rights reserved".*

* cited by examiner

REMOTE-CONTROLLED VERTICAL ASCENDING AND DESCENDING WORKSTATION

BACKGROUND

1. Technical Field

This disclosure relates generally to the field of workstations and more specifically relates to remote-controlled workstations.

2. State of the Art

Problems emerge when tall, natural and artificial objects need to be installed, maintained or repaired. Many natural columnar objects such as trees, especially palm trees, also require maintenance tasks such as de-limbing or cutting palm fronds to be performed at various intervals. Trees normally present a problem to persons attempting to perform tasks requiring ascending and descending, since tree trunks are not typically uniform in thickness or in surface consistency and may have limbs and other obstacles that may impede such endeavors.

In addition to trees, artificial structures such as those used to support above-ground utility and communication lines often require periodic or regular maintenance. The service of these structures and lines may cause persons to undergo undue risk from falling from great heights, electrocution from high-voltage electric lines, or other such inherent dangers.

Safety equipment may be provided to protect persons from falling hazards; however the equipment may be expensive, restrictive and uncomfortable for a user to wear. Further, the safety equipment such as for example, a safety harness may only provide minimal protection against falling hazards and offer no protection against electrocution should the user come into contact with a live electrical wire.

Scaffolding may be used as a means to work on columnar objects; however scaffolding is not conducive to portability and still leaves the person at risk to accidents from contact and falling injuries. Further, the scaffolding requires significant set-up and teardown time which may be expensive and time-consuming.

Ideally, a workstation would be stable, would separate users from many of the dangers described above, would require minimal maintenance, would operate safely and reliably, and would be manufactured at a modest expense. Thus, a need exists for a workstation to protect workers from dangerous conditions and to avoid the above-mentioned problems.

SUMMARY

The present invention relates to the field of workstations and more specifically relates to remote-controlled workstations.

An aspect of the present disclosure includes a vertical climbing workstation apparatus, the workstation apparatus comprising a frame, a powered drive system functionally coupled to the frame, a suspension system functionally coupled to the powered drive system, wherein the powered drive system is configured to engage a columnar object and under the condition that the powered drive system is operated the vertical climbing workstation apparatus moves with respect to the columnar object.

Another aspect of the present disclosure includes the columnar object having one end thereof embedded in a surface and an opposing end thereof that extends from the surface, and wherein the workstation apparatus is adapted to travel along the centrally located axis of the columnar object.

Another aspect of the present disclosure includes the frame further comprising an adjustable rail and one or more corner sections, the adjustable rail being functionally coupled between neighboring corner sections, the adjustable rail being adapted to adjust the distance between neighboring corner sections to adjust the frame.

Another aspect of the present disclosure includes the frame being configured to removably surround the columnar object and configured to be offset from the columnar object, and wherein the powered drive system engages the columnar object.

Another aspect of the present disclosure includes the adjustable suspension system being functionally coupled between the frame and the powered drive system and wherein the adjustable suspension system supports the powered drive system against columnar object.

Another aspect of the present disclosure includes the adjustable suspension system further comprising a linear actuator that is adapted to adjust the positional relationship between the powered drive system and the frame to support the powered drive system against the columnar object as the powered drive system engages irregularities on the columnar object.

Another aspect of the present disclosure includes the adjustable suspension system being retractable to release the powered drive system from the columnar object to allow rapid descent of the workstation apparatus from the columnar object Another aspect of the present disclosure includes the apparatus being configured to be operated by a user remotely positioned from the apparatus, the apparatus being controlled by a control unit in communication with a remote control operated by the user.

Another aspect of the present disclosure includes a semi-robotic arm, the semi-robotic arm being releasably coupled to the frame and the semi-robotic arm comprising one or more appendages functionally coupled together in succession by a joint therebetween.

Another aspect of the present disclosure includes the joint further comprising a pivot assembly and a rotation assembly, wherein the pivot assembly provides pivoting motion between successive appendages with respect to one another and wherein the rotation assembly provides rotational motion between successive appendages with respect to one another.

Another aspect of the present disclosure includes the semi-robotic arm further comprising a tool holder for engaging a tool.

Another aspect of the present disclosure includes the semi-robotic arm further comprising a camera for observing the tool.

Another aspect of the present disclosure includes the workstation apparatus comprising an adjustable frame having adjustable rails configured to expand or contract to adjust dimensions of the adjustable frame, a powered drive system functionally coupled to the frame, the powered drive system having a tracked-climber, and a suspension system functionally coupled between the powered drive system and the adjustable frame, wherein the tracked-climber is configured to engage a columnar object and under the condition that the powered drive system is operated the workstation apparatus moves with respect to the columnar object.

Another aspect of the present disclosure includes the tracked-climber further comprising a motor, a gear set functionally engaged by the motor, a power pulley functionally engaged by the gear set, and a track functionally engaged by the power pulley, wherein the motor provides power to rotate the gear set to provide rotation to the power pulley, wherein the rotation of the power pulley causes the track to move tangentially in relation to the power pulley, and wherein the tangential movement of the track results in the workstation apparatus traveling along the axis of the columnar object.

Another aspect of the present disclosure includes the powered drive system comprising three tracked-climbers individually coupled to the frame.

Another aspect of the present disclosure includes each of the tracked-climbers being coupled to a respective suspension system and each suspension system being configured to support the corresponding tracked-climber against the columnar object as the workstation apparatus ascends and descends the columnar object and thereby engages irregularities in the columnar object.

Another aspect of the present disclosure includes the motor being pneumatically, hydraulically, or electrically controlled.

Another aspect of the present disclosure includes the tracked-climber further comprising a tensioning member that is adapted to adjust a tension of the track.

Another aspect of the present disclosure includes a method of use for a vertical climbing workstation apparatus comprising, placing the workstation apparatus around a columnar object, bringing tracked-climbers of a powered drive system into contact with the columnar object using a remote control, activating tracks of the tracked-climbers to control ascension and decent of the workstation with respect to the axis of the columnar object, and performing tasks on the columnar object.

Another aspect of the present disclosure includes the method of use for a vertical climbing workstation apparatus further comprising, removing an adjustable rail from a frame of the workstation apparatus to place the workstation apparatus around the columnar object, replacing the adjustable rail in the frame after the workstation apparatus has been placed around the columnar object, adjusting the adjustable rail to expand or contract the frame, operating the tracked-climbers by remote control to control the ascension and decent of the workstation apparatus on the columnar object, performing tasks on the columnar object using a semi-robotic arm having a tool and a camera attached thereto, retracting the tracks from the columnar object to allow the workstation to descend rapidly from the columnar object, operating the tracked-climbers to control the descent of the columnar object until the columnar object reaches a ground surface, removing the adjustable rail to remove the workstation apparatus from around the columnar object, and removing the workstation from around the columnar object.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
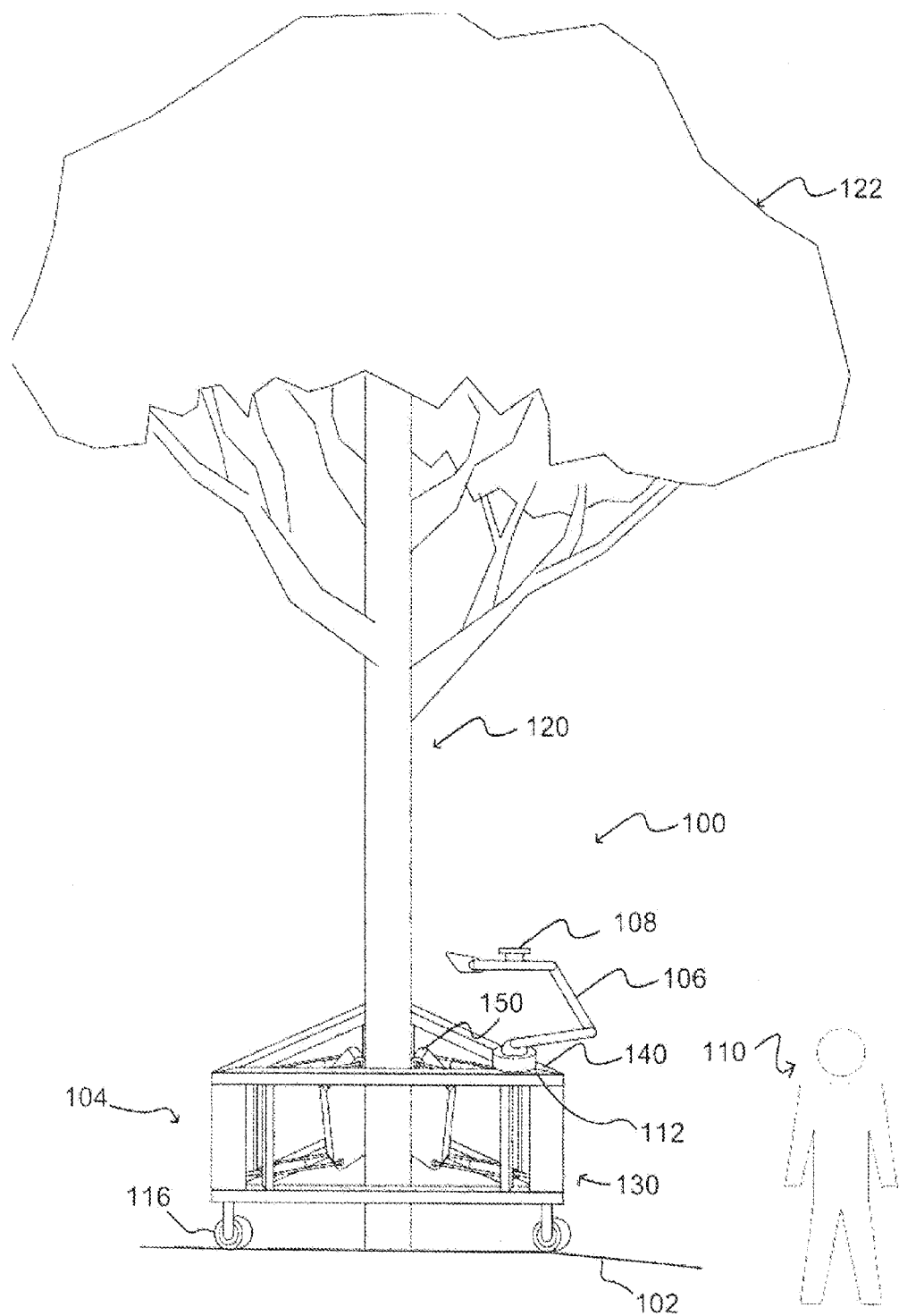
FIG. 1 is a perspective view of an embodiment of a workstation in accordance with the present disclosure.
Figure 2:
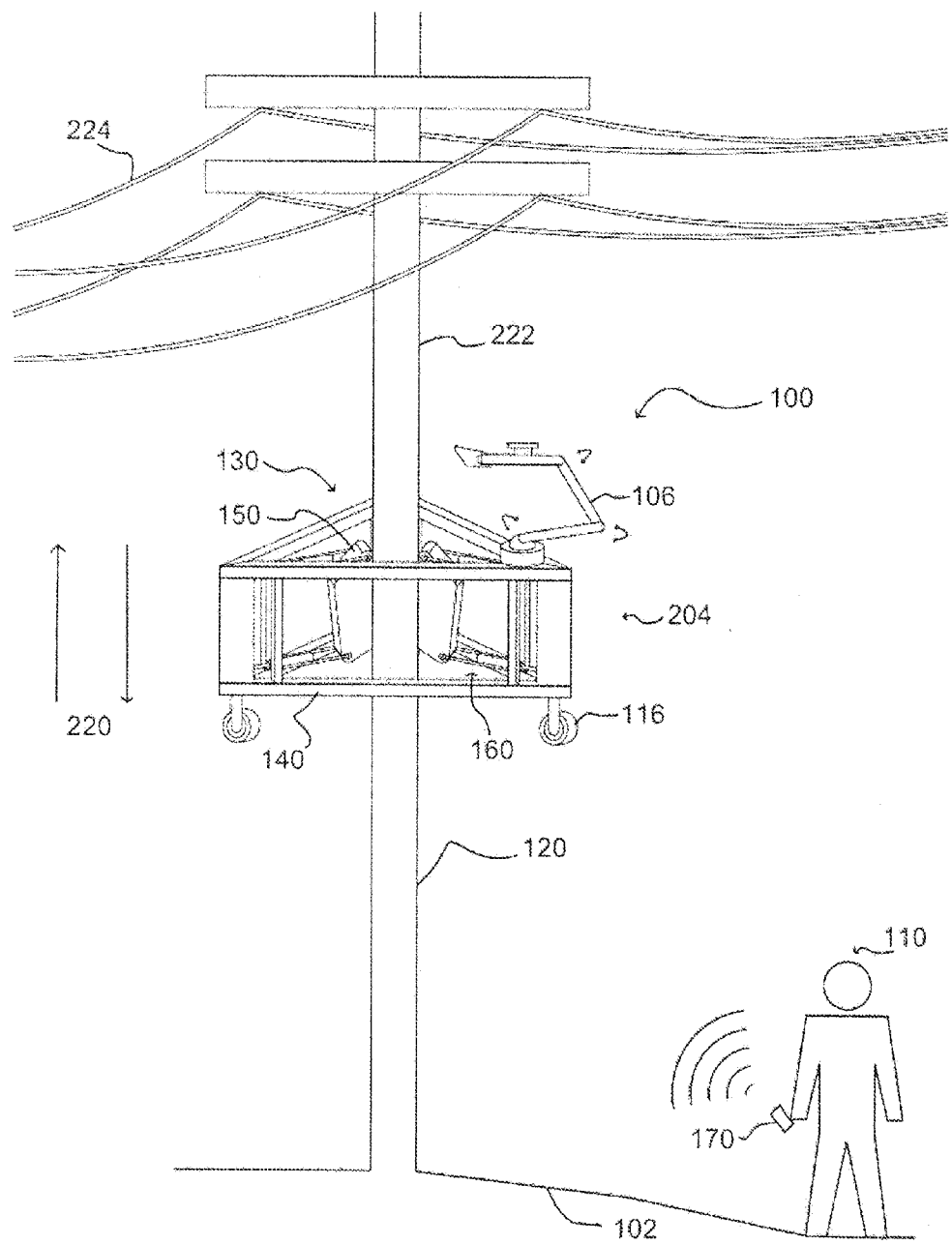
FIG. 2 is a perspective view of an embodiment of a workstation in accordance with the present disclosure.
Figure 3:
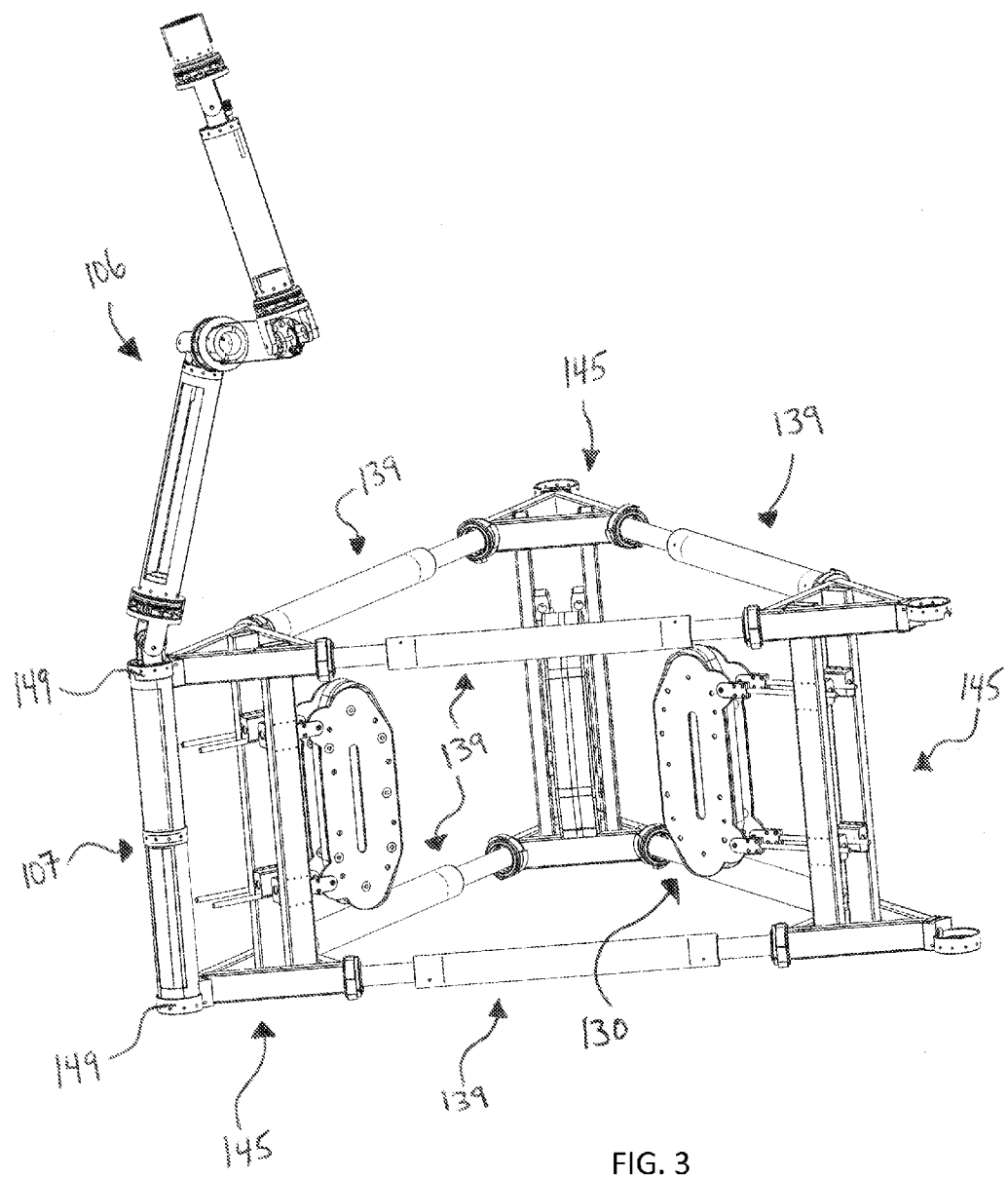
FIG. 3 is a perspective view of components of an embodiment of a workstation in accordance with the present disclosure.

Referring to the drawings, FIGS. 1-3 depict perspective views, respectively, illustrating vertical climbing workstation apparatus 100 at rest, preceding use on columnar object 120 in FIG. 1, and workstation 100 in use, on columnar object 120 in FIG. 2, and workstation 100 not surrounding a columnar object 120, all according to embodiments of the present disclosure. Workstation apparatus 100 is shown in FIG. 1 in a non-employed position 104. Workstation apparatus 100 is resting on ground 102, surrounding the base of tree 122 as would be realized during a typical setup or dismantle process. FIG. 2 illustrates workstation apparatus 100 in employed-position 204 in use on utility pole 222. FIG. 3 depicts a perspective view of an embodiment of the workstation 100.

A vertical climbing workstation apparatus 100 according to the present disclosure comprises an adjustable frame 140, a powered drive system 130, an adjustable suspension system 160, and a remote control 170 that may be operated by a user 110. As depicted in FIG. 3, portions of the workstation apparatus 100 are shown separate from columnar object 120 to provide an unobstructed view of the relation between these components of the workstation apparatus 100. The overall design of the workstation apparatus 100 is targeted at durability for longevity, cost-effectiveness in use and to protect the user 110 from unnecessary risk during repair or maintenance tasks. The workstation apparatus 100 is shown in pre-use and in-use in FIGS. 1 and 2, respectively. The workstation apparatus 100 may comprise a variety of sizes and shapes and be manufactured from various materials. Ideally, the workstation apparatus 100 is grounded and/or comprises non-conductive materials to insulate user 110 from electrical shock. Moreover, by the user 110 being remotely positioned from the workstation 100 while operating the workstation 100 via remote control, the user 110 is also separated, or otherwise removed, from the possibility of electric shock.

Figure 22:
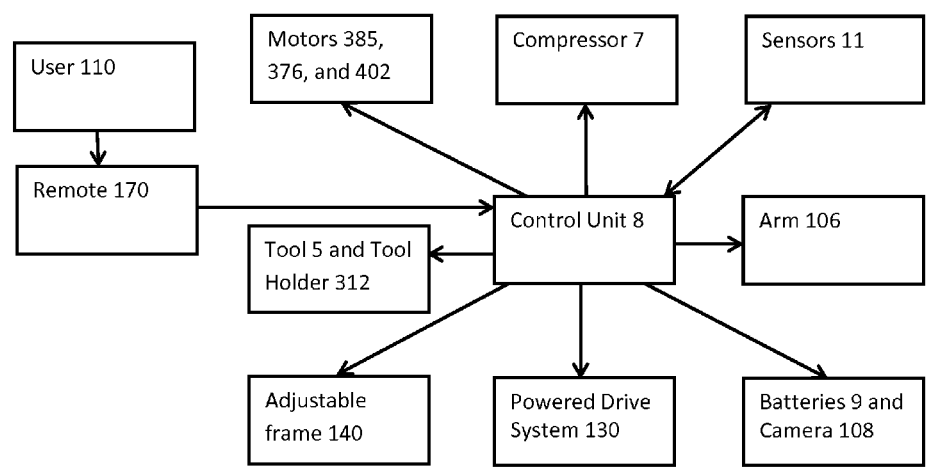
FIG. 22 is a schematic view of an operation of an embodiment of a workstation in accordance with the present disclosure.

The workstation 100 may be powered by on-board battery power, via one or more batteries 9 positioned on the workstation 100, and operated via one or more wireless controllers that communicate wirelessly with the control unit 8 on the workstation 100, the control unit 8 comprising a computer system, including, but not limited to, for example, a processor (CPU), an internal storage unit, random access memory (RAM), software, a network card, alternative inputs for a keyboard, mouse, joystick or other input device, a motherboard, and components, such as receivers and transmitters, for sending and receiving wireless signals. The computer system herein described is configured to control the operational aspects of the workstation 100. For example, the software may be a computer program that is developed and configured to operate the workstation 100 according to its intended operation, as described herein. In embodiments of the workstation 100, the control unit 8 may be utilized to control the adjustable frame 140, the powered drive system 150, the camera(s) 108, the arm 106, the compressor 7, the individual motors, the tool 5 and the tool holder 312, and other operational aspects of the workstation 100, as depicted in FIG. 22.

Alternatively, the workstation 100 may be powered by batteries 9 positioned remotely from the workstation 100 and the workstation may be controlled, or otherwise operated, via a combined power supply and a wired controller, such as, for example, a wiring harness. The adjustable frame 140 of workstation apparatus 100 may be offset from and surround an entire exterior circumference of the columnar object 120, such as the tree 122 as shown in FIG. 1 or the utility pole 222 of FIG. 2, to which adjustable frame 140 may be functionally and removably coupled. The workstation may also be powered by pneumatic control or hydraulic control as will be herein described.

Figure 4:
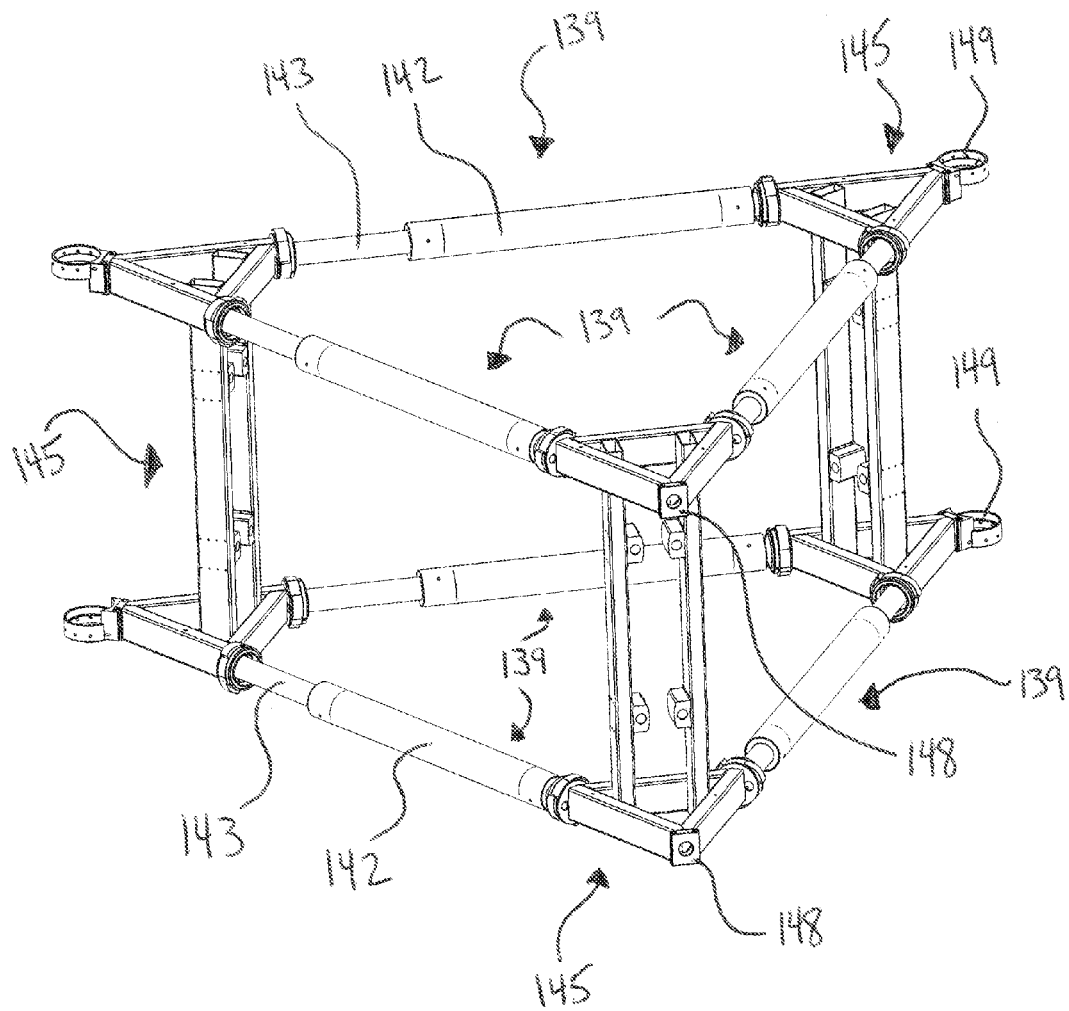
FIG. 4 is a perspective view of components of an embodiment of a workstation in accordance with the present disclosure.

As depicted in FIGS. 3-4, embodiments of the workstation 100 may include the adjustable frame 140 and can be manufactured from square or rectangular tubing for cost-effectiveness in manufacturing. The adjustable frame 140 may comprise one or more corner sections 145 and an adjustable rail 139 coupled between consecutive cornering sections 145. The adjustable rail 139 may further comprise at least one frame expansion housing 142 and a corresponding frame expansion rod 143 that is inserted therein and is configured to move therein. For example, the adjustable frame 140 may be adapted and configured to be expandable and contractible using at least one frame expansion housing 142 and a corresponding frame expansion rod 143, wherein the frame expansion rod 143 may move with respect to the frame expansion housing 142 to thereby allow workstation apparatus 100 to expand or retract in size, as needed. For example, standard wireless feedback sensors may be positioned on the workstation 100 to sense the changing diameter or changing surface conditions of the columnar object 120 as the workstation 100 travels along the axis of the columnar object 120. For example, the adjustable frame 140 may be configured to allow the frame expansion rods 143 and the frame expansion housing 142 to move with respect to one another in response to the feedback from the sensors to adjust the size of the adjustable frame 140. The sensors may communicate with the control unit 8 to instruct the adjustable frame 140 to automatically expand in response to the increasing diameter of the columnar object 120. Conversely, the sensors may communicate with the control unit 8 to instruct the adjustable frame 140 to automatically retract in response to the decreasing diameter of the columnar object 120. In this way, the workstation 100 is adaptable to be fitted around columnar objects 120 of varying dimensions and perimeters of round and semi-round profiles. Moreover, one or more frame expansion rods 143 may be decoupled from or coupled to corner sections 145, so as to permit the one or more frame expansion rods 143 to detach from the workstation 100 to allow the workstation 100 to be taken off of and transported away from the columnar object 120.

As depicted in FIG. 5, the corner section 145 may further comprise vertical support beams 146 and horizontal support beams 147. The vertical support beams 146 may have attached thereto the horizontal support beams 147 on each distal end thereof. The vertical support beams 146 may further comprise powered drive system mounts 131 thereon to support the functional operation of the powered drive system 130. Each of the mounts 131 may have a through bore therein 131a. The corner section 145 may further comprise a bracket mount 148. The bracket mount 148 may be configured to receive and releasably couple thereto a bracket 149 that may be configured to receive and releasably couple thereto an arm base 107 that may be configured to receive and releasably couple thereto a semi-robotic arm 106, to be discussed in greater detail below.

Figure 5A:
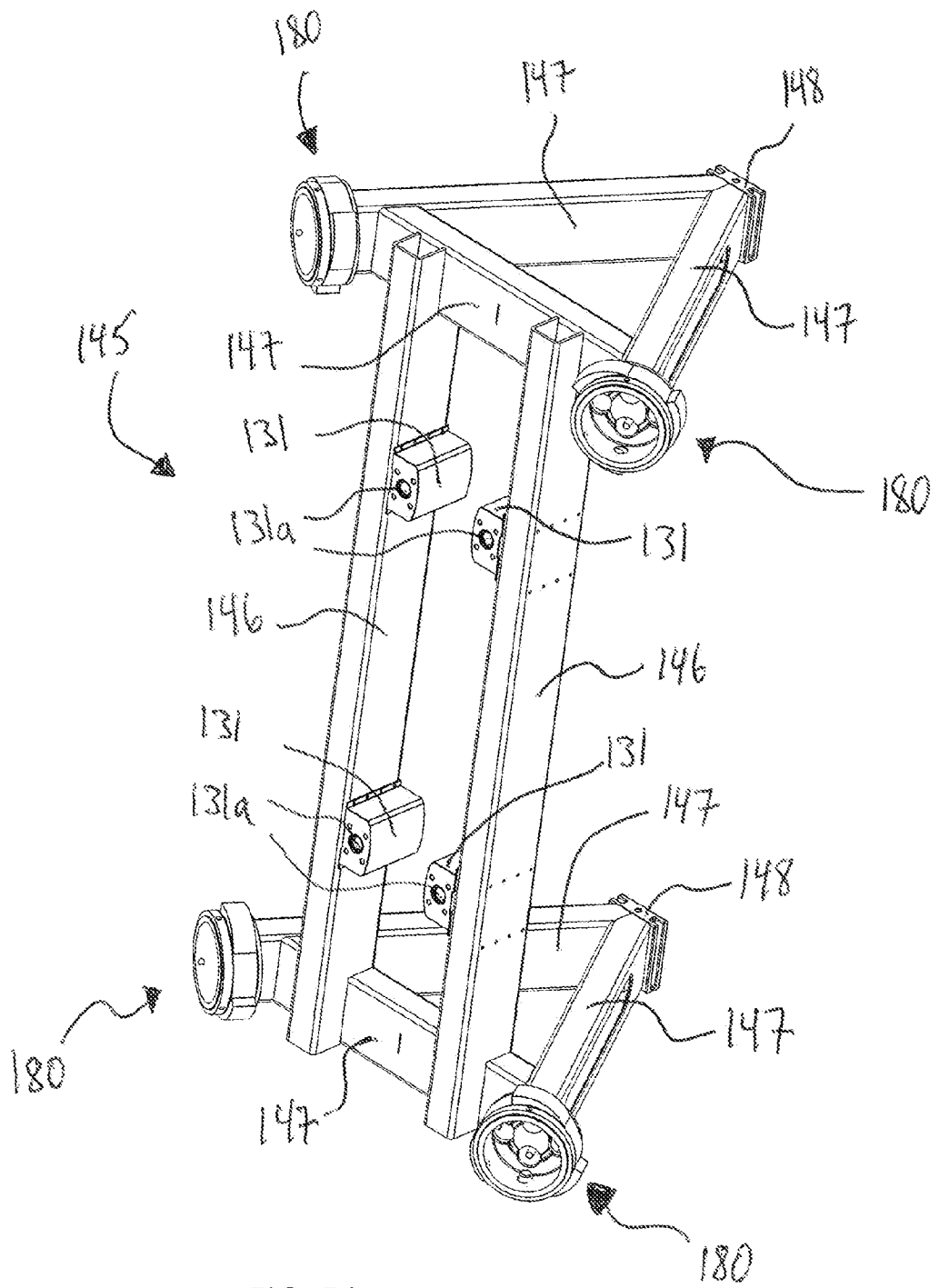
FIG. 5A is a perspective view of components of an embodiment of a workstation in accordance with the present disclosure.
Figure 6:
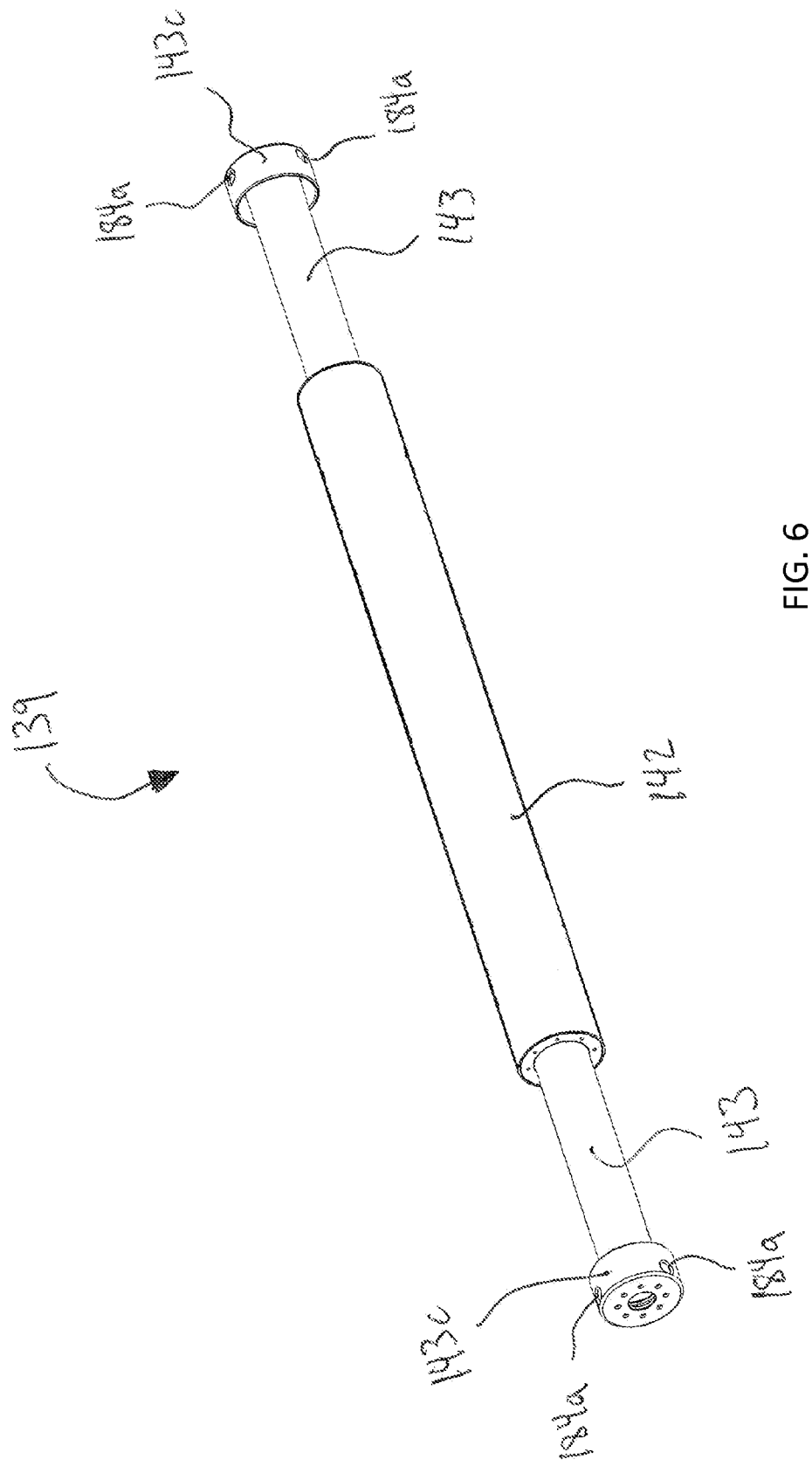
FIG. 6 is a perspective view of components of an embodiment of a workstation in accordance with the present disclosure.
Figure 7:
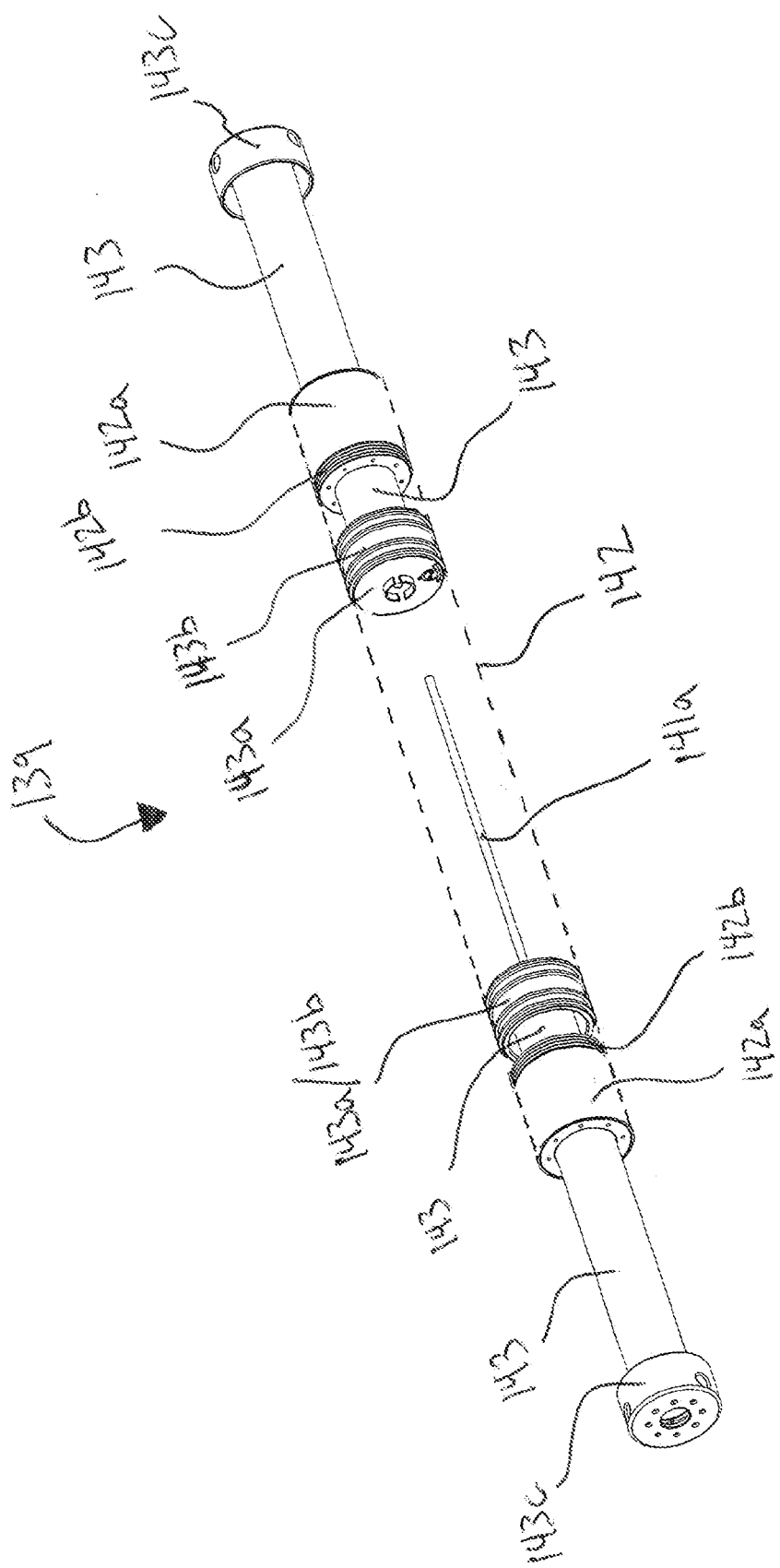
FIG. 7 is a perspective view of components of the embodiment of the workstation depicted in FIG. 6 in accordance with the present disclosure. The housing 142 is shown in broken- or dotted-lines to reveal the interior of the housing 142.
Figure 8:
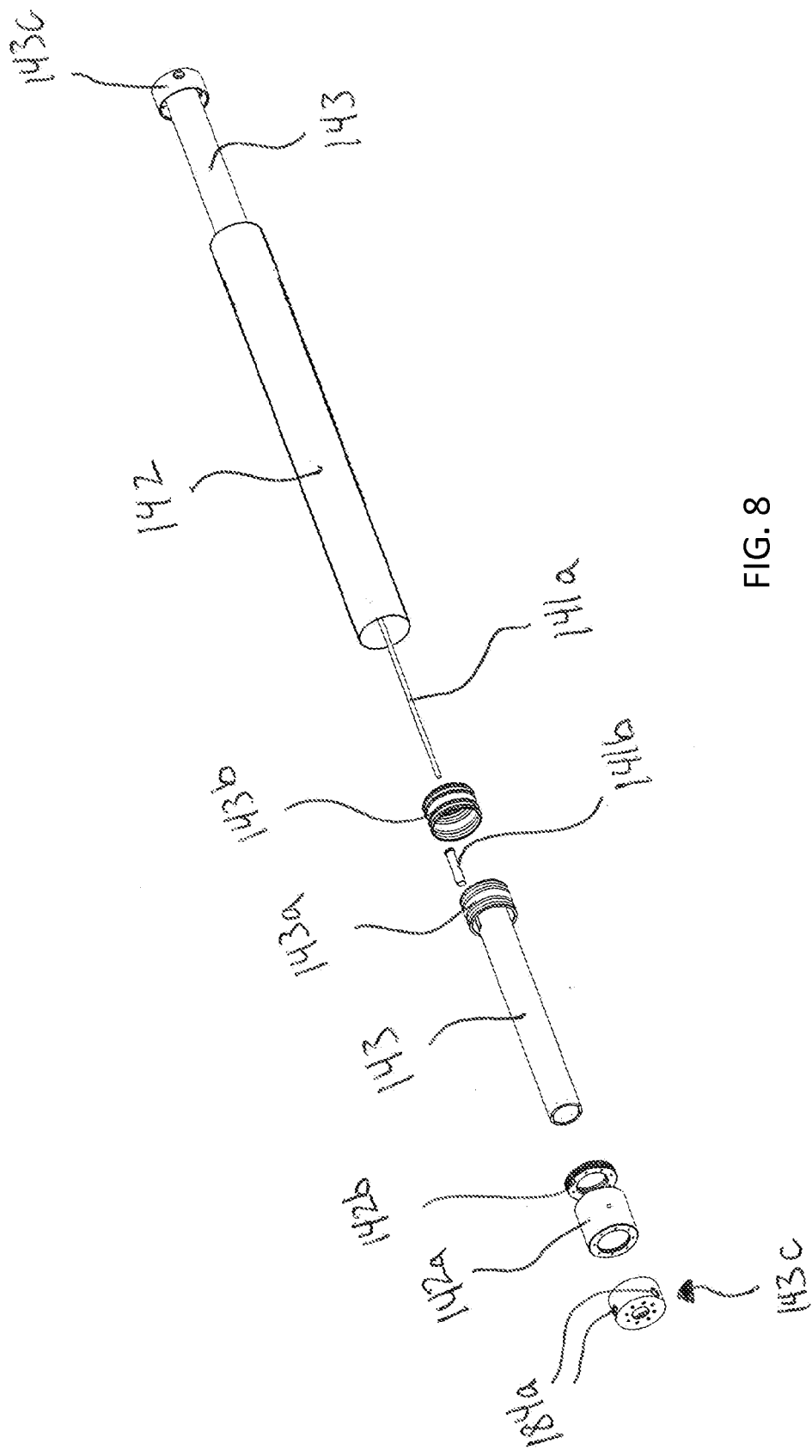
FIG. 8 is an exploded view of components of the embodiment of the workstation depicted in FIGS. 6 and 7 in accordance with the present disclosure.

As depicted in FIG. 5A, the corner section 145 may further comprise one or more corner frame couplers 180, wherein each of the corner frame couplers 180 may be configured to receive a corresponding frame expansion end cap 143c positioned on a distal end of a frame expansion rod 143, as depicted in FIGS. 6-8. Embodiments of the workstation 100 include the coupler 180 being operated to functionally engage the end cap 143c to thereby secure the frame expansion rod 143 to the corner section 145 via the mechanical locking relationship between the coupler 180 and the corresponding end cap 143c.

Figure 5B:
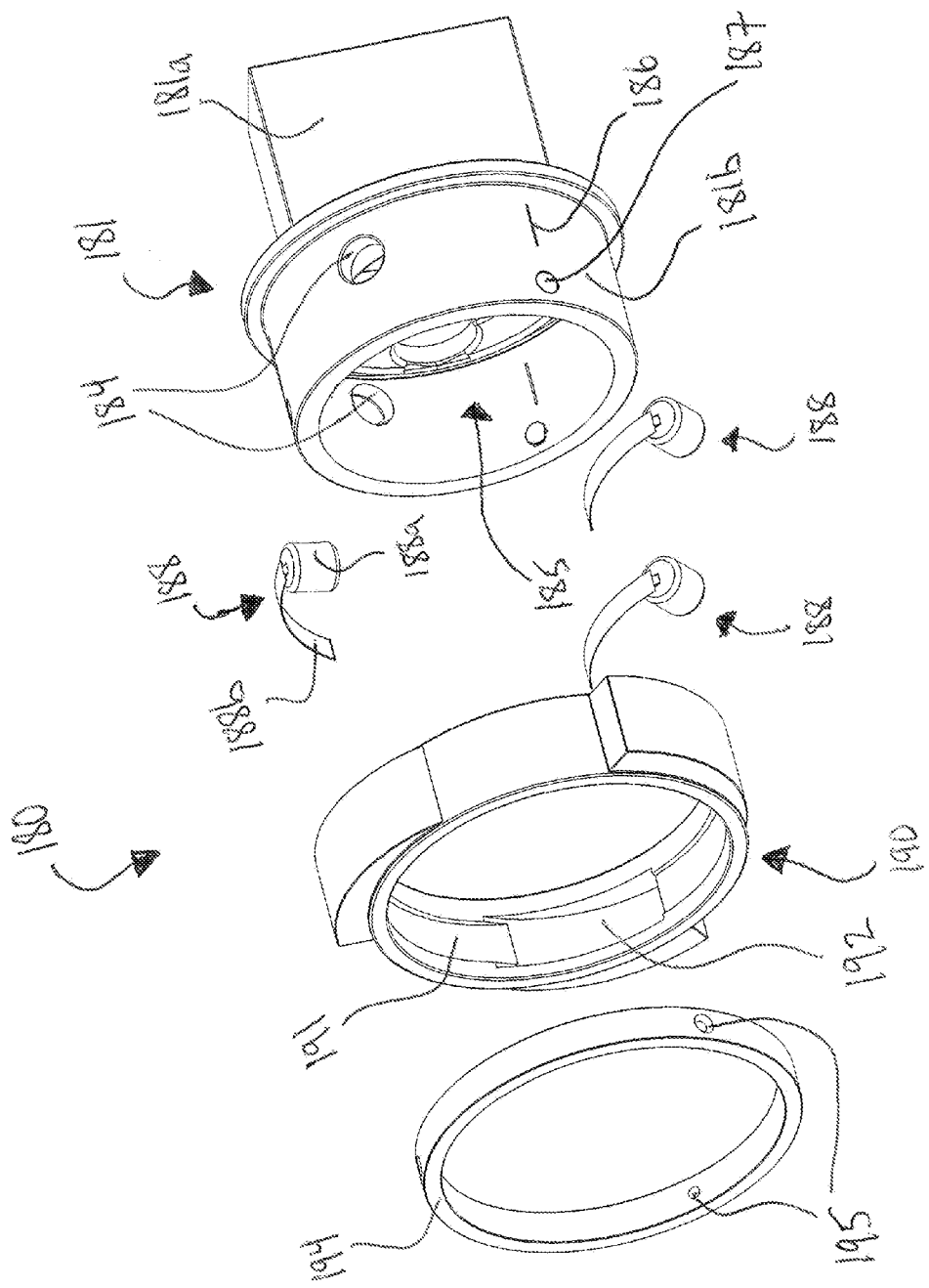
FIG. 5B is an exploded view of a component of an embodiment of a workstation in accordance with the present disclosure.

As depicted in FIG. 5B, each of the couplers 180 may further comprise a body 181, one or more pins 188, a quick release member 190, and a securing ring 194. The body 181 may be further comprised of a securing member 181a and a circular portion 181b. The securing member 181a may be configured to engage a corresponding horizontal support beam 147 of the corner section 145. The support beam 147 may be hollow. The support beam 147 and the securing member 181a may be configured to have corresponding shapes, such that the securing member 181a may be inserted within the hollow portion of the support beam 147. Thereafter, the securing member 181a may be fixedly coupled to the support beam 147, such that the support beam 147 supports and secures thereto the coupler body 181. On the other hand, the circular portion 181b may further comprise engagement openings 184 positioned at regular intervals around the circumference of the outer surface of the circular portion 181b. The circular portion 181b may also comprise slits 186 in the outer surface positioned at regular intervals. The circular portion 181b may also comprise holes 187 positioned in the outer surface positioned at regular intervals. The circular portion 181b may be configured to define a hollow cavity 185 therein. The engagement openings 184 may be configured to extend completely through the circular portion 181b and into the hollow cavity 185. The slits 186 and the holes 187 may also be configured to extend completely through the circular portion 181b.

Each of the pins 188 may be comprised of a pin head 188a and a pin tail 188b. Each of the pins 188 may be configured to engage the outer surface of the circular portion 181b, such that the pin head 188a of one of the pins 188 may engage a corresponding engagement opening 184. Likewise, the pin tail 188b of one of the pins 188 may be configured to engage a corresponding slit 186. In this way, each of the pins 188 may be anchored to the circular portion 181b while at the same time allowing the pin head 188a of each of the pins 188 to slidably engage the axial opening of the engagement opening 184. The pin head 188a may be configured to be circular in shape to correspond to the circular shape of the engagement opening 184. The pin tail 188b may be configured to flex, or otherwise bend, to allow the pin head 188a to move in or out of the engagement opening 184 in response to force applied to the pin 188.

A quick release member 190 may be configured to engage each of the pins 188 on the circular portion 181b, as well as rotatably communicate with the circular portion 181b. The quick release member 190 may be configured to have a throughbore therein, the throughbore being configured to fit over and functionally communicate with the outer surface of the circular portion 181b and the pins 188. The quick release member 190 may have an internal indention 191 along the inside circumference of the quick release member 190. The internal indention 191 may be configured to functionally engage, and house, the pins 188, including the pin tail 188b and the pin head 188a of each of the pins 188. The internal indention 191 may further comprise one or more graduated depressions 192 therein. The graduated depressions 192 may be configured to communicate with the pins 188, such that at the deepest point of the graduated depression 192, the pin head 188a does not functionally engage the engagement opening 184, or at least does not pass completely through the circular portion 181b and into the hollow cavity 185. In this position, the pin head 188a is in a non-engaged position, which purpose will be described hereinafter in greater detail. At the shallowest point of the graduated depression 192, the pin head 188a functionally engages the engagement opening 184 and passes completely through the circular portion 181b and into the hollow cavity 185. In this position, the pin head 188a is in an engaged position, which purpose will be described hereinafter in greater detail. Thus, the quick release member 190 may be rotated about the circular portion 181b to transition the pins 188 from the deepest portion of the graduated depression 192 to the shallowest portion of the graduated depression 192 to transition the pin head 188a from the non-engaged position to the engaged position, respectively. Likewise, the quick release member 190 may be rotated about the circular portion 181b to transition the pins 188 from the shallowest portion of the graduated depression 192 to the deepest portion of the graduated depression 192 to transition the pin head 188a from the engaged position to the non-engaged position, respectively. The rotational movement of the quick release member 190 may be repeatedly performed to transition the pins 188 between their respective engaged and non-engaged positions.

The securing ring 194 may be configured to functionally engage the circular portion 181b and function to maintain the engagement of the quick release member 190 on the circular portion 181b. The securing ring 194 may have holes 195 that are configured to correspond to the holes 187 in the circular portion 181b, such that a fastener (now shown) may be inserted through the holes 195 and 187 to secure the securing ring 194 to the circular portion 181b.

As previously mentioned, the end cap 143c of the frame expansion rod 143 may be configured to repeatedly and releasably couple to the coupler 180 on the corner section 145. The end cap 143c may be configured with engagement ports 184a that are positioned at regular intervals around the outer circumference of the end cap 143c. The engagement ports 184a may be configured to correspond to the engagement openings 184 in the circular portion 181b. As such, the engagement ports 184a may be configured to likewise receive a corresponding pin head 188a that has been forcibly inserted completely through the engagement opening 184 under the condition that the pins 188 are in the engaged position. As suggested, in the engaged position 188, the pin head 188a of each of the pins 188 functionally engages both the engagement opening 184 of the circular portion 181b and the respective engagement port 184a in the end cap 143c. In this way, in the engaged position, the pins 188 function to functionally engage the frame expansion rod 143 to the corner section 145, via the mechanical and functional engagement of the end cap 143c and the coupler 180. In the non-engaged position, the pins 188 release the end cap 143c from the coupler 180 and permit the frame expansion rod 143 to be removed from the corner section 145. As a result of the above, the simple operation of rotating the quick release member 190 about the circular portion 181b permits the pins 188 to transition easily and quickly between an engaged position and a non-engaged position to easily and quickly release or couple, as the case may be, the frame expansion rods 143 to the corner sections 145. This quick release design permits the user 110 to quickly and easily assemble or disassemble the workstation 100 form around the columnar object 100.

As depicted in FIG. 6, the workstation 100 may comprise the adjustable rail 139. The adjustable rail 139 may further comprise a frame expansion housing 142 and one or more corresponding frame expansion rods 143. Embodiments of the workstation 100 include the frame expansion housing 142 being hollow in portions thereof to permit each of the frame expansion rods 143 to partially reside therein. For example, as depicted in FIG. 7, portions of the frame expansion rods 143 may reside within the hollow portion of the frame expansion housing 142 and other portions of the frame expansion rods 143 may reside outside of the housing 142. FIG. 7 shows the housing 142 in dotted lines, to reveal the interior of the housing 142, such that the portions of the frame expansion rods 143 that are within the frame expansion housing 142 are visible within the housing. The frame expansion rods 143 may be configured to functionally engage the hollow portion of the housing 142. For example, as depicted in FIGS. 7 and 8, a frame expansion rod head 143a may be coupled to a distal end portion of the frame expansion rod 143 that is placed within the hollow portions of the frame expansion housing 142. The frame expansion rod head 143a may be configured to slidably engage, or otherwise communicate with, the interior surface of the hollow frame expansion housing 142. A head seal 143b may be placed over the rod head 143a to seal the communication between the frame expansion rod 143 and the interior of the frame expansion housing 142, such that an airtight chamber 141c is established. Further in example, a frame expansion housing cap 142a may be coupled to an end portion of the frame expansion housing 142, or otherwise fixed with respect to the frame expansion housing 142, and the frame expansion housing cap 142a may be configured to slidably engage, or otherwise communicate with, the frame expansion rod 143. For example, the housing cap 142a may be a linear bearing that permits the slidable communication between the expansion rod 143 and the housing 142. In this way, the frame expansion rod 143 and the frame expansion housing 142 may move with respect to one another. A cap seal 142b may be positioned against the internal side of the housing cap 142a, such that the seal 142b completes the airtight chamber 141c mentioned above. Specifically, the head seal 143b and the cap seal 142b each communicate with the interior surface of the housing 142 to create the airtight chamber 141c within the housing 142 between the cap seal 142b and the head seal 143b.

The expansion rod head 143a may be further configured to prevent the expansion rod 143 from disengaging from the frame expansion housing 142, such that the frame expansion rod head 143a remains within the housing 142. Of course, the expansion housing cap 142a may be manually removed from the housing 142 to allow the frame expansion rod 143 to disengage and be removed from the housing 142, if desired by the user, for maintenance and repair, or the like.

The frame expansion rods 143 may pneumatically communicate with the frame housing 142. As depicted in FIGS. 7 and 8, an air line 141a and an air valve 141b may be provided to facilitate pneumatic communication between the frame expansion rods 143 and the interior of the frame housing 142. Air within an air tank may be compressed in a compressor 7, and the resulting high-pressure air may flow through the air valve 141b and through the air line 141a and into the airtight chamber 141c created between each set of the cap seal 142b and the head seal 143b. Air pressure may be increased by flowing air into the airtight chamber 141c to push against both the frame expansion rod head 143a and the housing cap 142a to force the frame expansion rod 143 to move axially inward with respect to the housing 142. In other words, as the pressure inside the airtight chamber 141c is increased, the force of the pressure causes the frame expansion rod head 143a and the housing cap 142a to move apart from one another, which reduces the length of the frame expansion rod 143 that extends outside the housing 142, which reduces the overall length of the adjustable rail 139. Similarly, air pressure may be reduced by flowing air out of the airtight chamber 141c to reduce the force against both the frame expansion rod head 143a and the housing cap 142a to allow the frame expansion rod 143 to move axially outward with respect to the housing 142. In other words, as the pressure inside the airtight chamber 141c is decreased, the reduced force of the pressure causes the frame expansion rod head 143a and the housing cap 142a to move toward one another, which increases the length of the frame expansion rod 143 that extends outside the housing 142, which increases the overall length of the adjustable rail 139. Accordingly, such a pneumatic configuration may be used to fix the positional relationship between the frame expansion rods 143 and the interior of the frame housing 142, as determined by the user 110, to adjust the overall length of the adjustable rail 139 as determined by the diameter or size of the columnar object 120 on which the workstation 100 is mounted. Further, the pneumatic configuration may be used to fix the positional relationship between the frame expansion rods 143 and the interior of the frame housing 142, as determined by wireless communication with the operator's computerized control unit, the computer program controlling the pressure to achieve the desired movement within predetermined parameters, making this function transparent to the user except when attaching or removing the workstation 100 from a columnar object 120.

In embodiments of the workstation 100, the outward pressure and movement of the adjustable rail 139 is provided by the columnar object 120 and is communicated to the frame expansion rods 143 via the push back pressure of the columnar object 120 on the powered drive system 130 which is attached to the frame corner assemblies 145 to which the adjustable rails 139 are attached via the locking mechanism between the coupler 180 and the end cap 143c. In other words, as pressure is produced by the columnar object 120 on the powered drive system 130, the respective tracked climbers 150 of the powered drive system 130 pushes against the respective corner sections 145 to which the tracked climbers 150 are functionally coupled. As pressure is thus exerted on the corner sections 145, the adjustable rail 139 may need to adjust to maintain the tracked climbers 150 on the columnar object 120. Therefore, sensors on the workstation 100 communicate with the control unit 8 which communicates with the air compressor which communicates with the airtight chamber 141c which adjusts the length of the adjustable rail 139.

The pressurized interior of the airtight chamber 141c may be depressurized to manually adjust the frame expansion rods 143 with respect to the housing 142 or to disengage the frame expansion rods 143 from the housing 142. The pressurized interior of the airtight chamber 141c may alternatively be automatically adjusted to adjust the frame expansion rods 143 with respect to the housing 142 or to disengage the frame expansion rods 143 from the housing 142. The automatic adjustment of the size of each of the adjustable rails 139 may be facilitated by feedback received by the powered drive system 130. To maintain the powered drive system 130 in contact with the columnar object 120, the adjustable rail 139 may need to automatically adjusted, as described above, in real time to accommodate for the changing diameter of the columnar object 120. In a similar manner, hydraulic or mechanical means may be utilized to automatically or manually adjust and fix the positional relationship between the frame expansion rods 143 and the interior of the frame housing 142, as described herein. In fact, the structural configuration above provides that.

Figure 9:
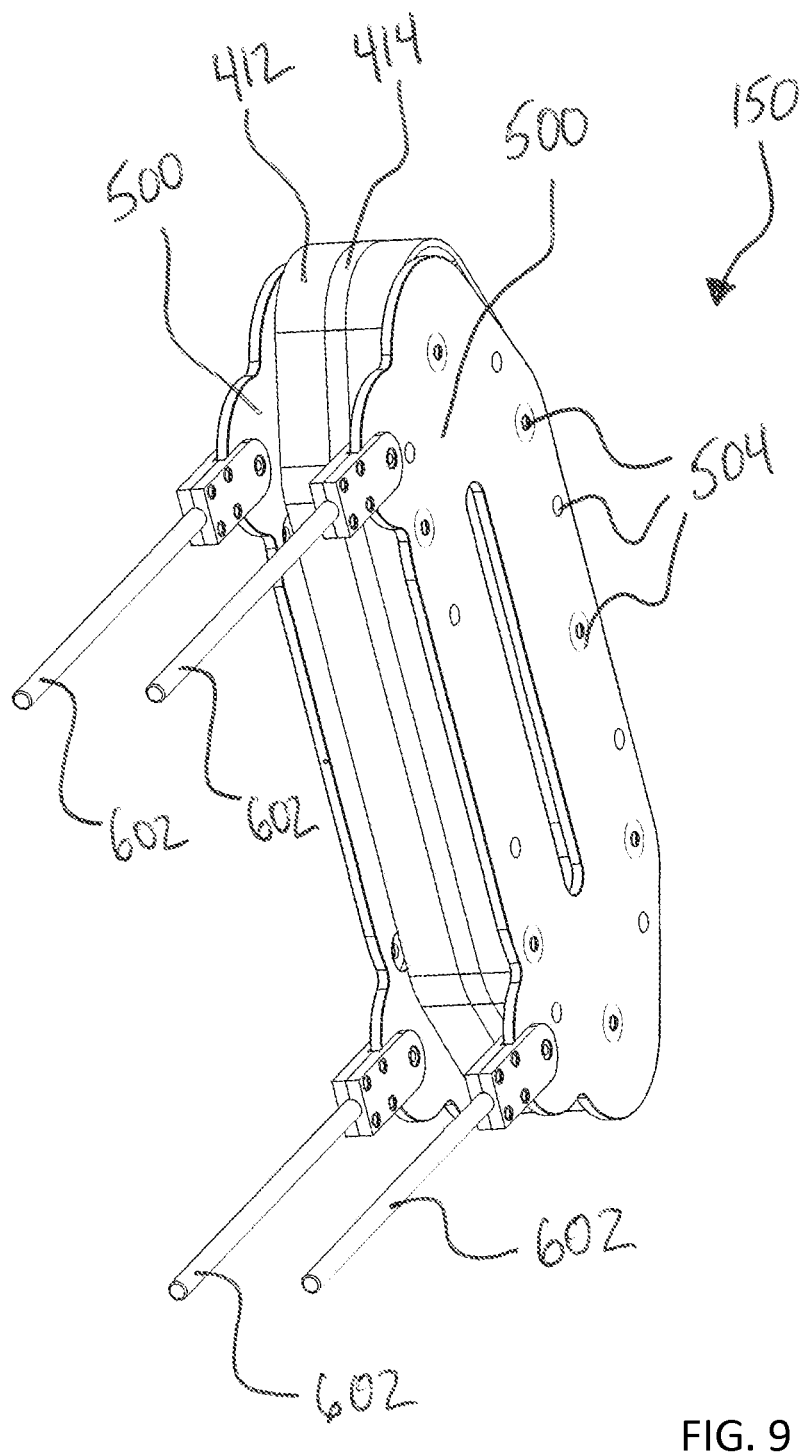
FIG. 9 is a perspective view of components of an embodiment of a workstation in accordance with the present disclosure.
Figure 10:
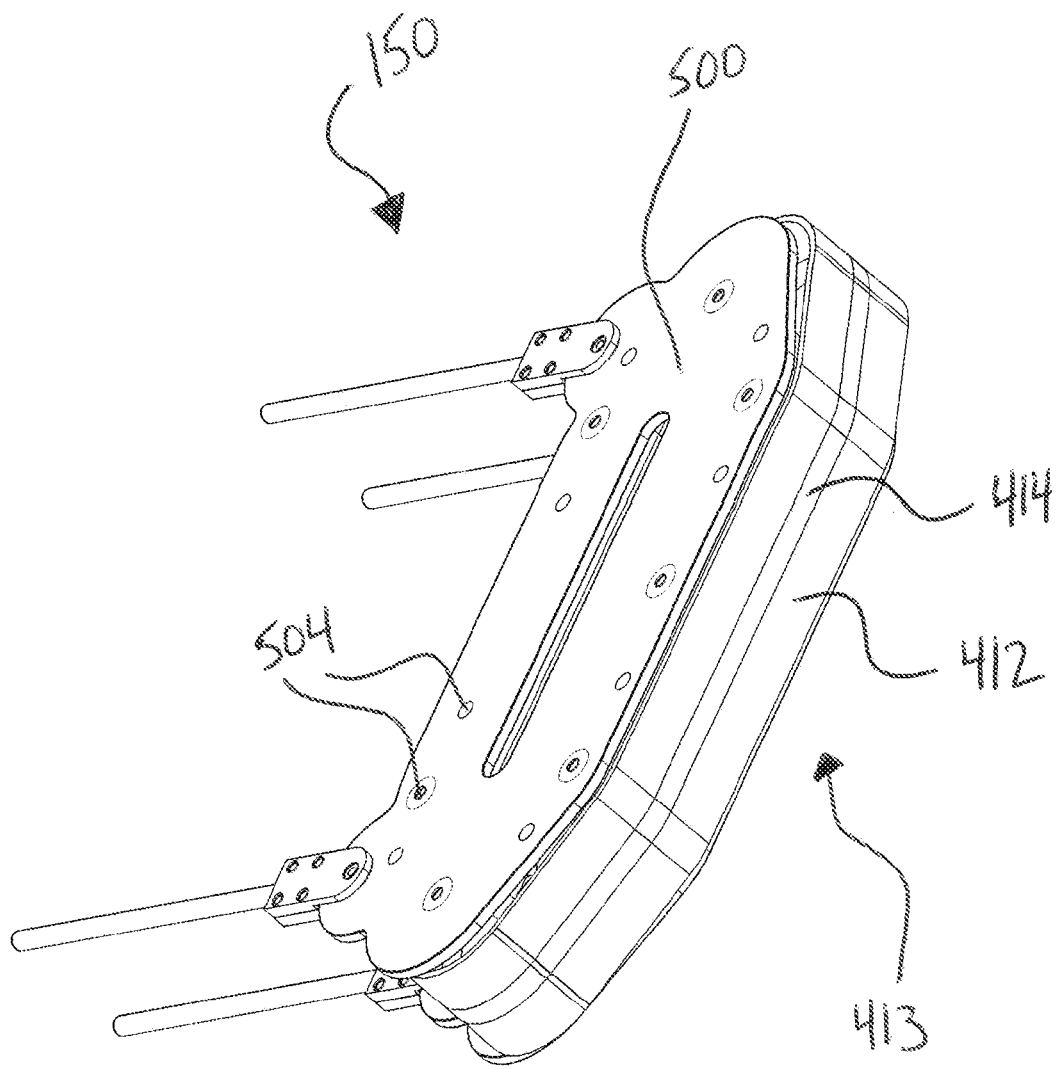
FIG. 10 is a perspective view of components of the embodiment of the workstation depicted in FIG. 9 in accordance with the present disclosure.
Figure 11:
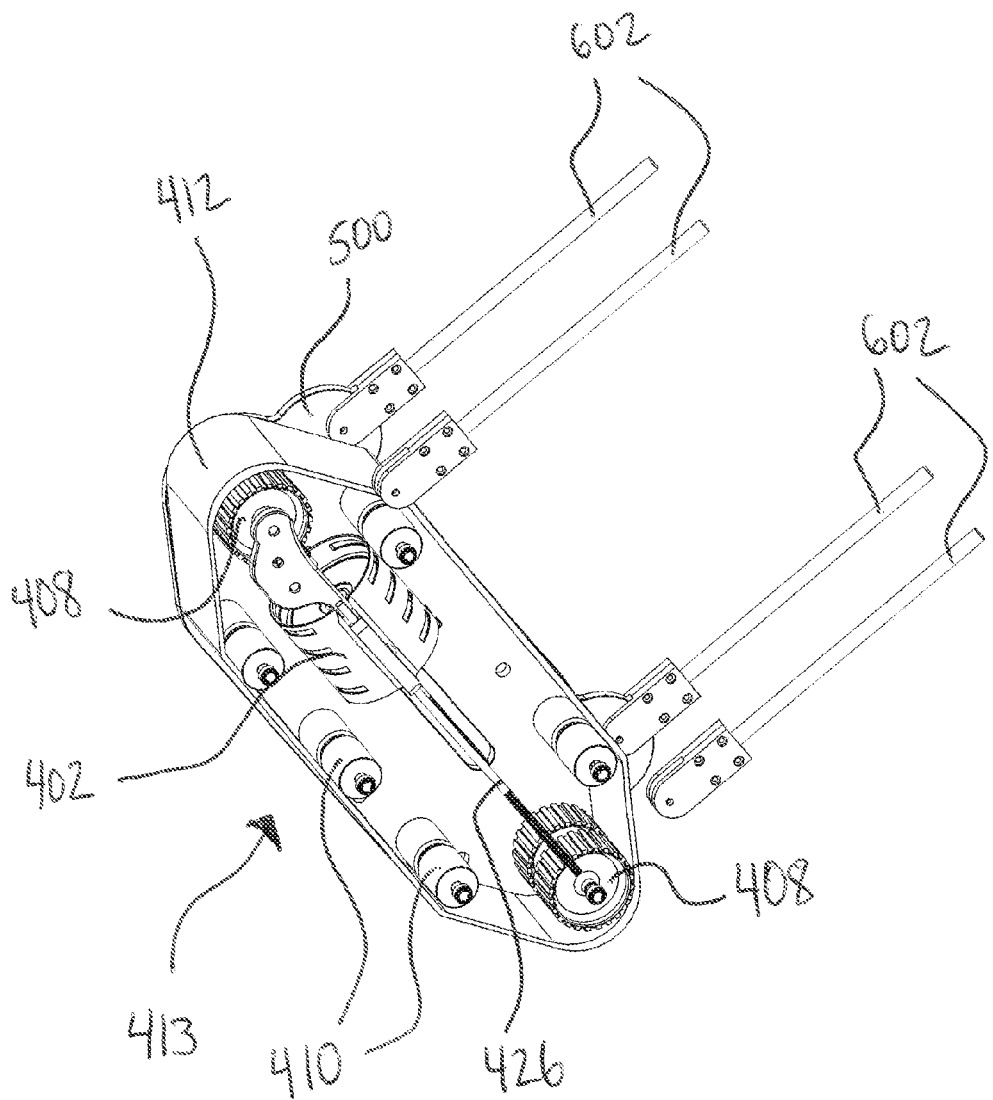
FIG. 11 is a cut-away perspective view of components of the embodiment of the workstation depicted in FIG. 9 in accordance with the present disclosure.

As depicted in FIGS. 1-3, embodiments of the workstation 100 further comprise a powered drive system 130 coupled thereto. The powered drive system 130 may further comprise one or more tracked climbers 150, as depicted in FIGS. 9-11, that work together to result in the workstation 100 being able to ascend and descend on the columnar object 120. Columnar objects 120 may be inconsistent with respect to the circumference size, such as the tree 122 that may narrow from bottom to top of the tree 122. In addition, the columnar object 120 may have many surface variations such as knots, small limbs, bark irregularities, and other such conditions. As a result, the powered drive system 130 may be configured to accommodate for these inconsistent irregularities.

As depicted in FIGS. 9-11, a tracked climber 150 comprises a track 412, enclosure panels 500, and rails 602. The track 412 may be supported and oriented between opposing enclosure panels 500 and configured to move therebetween, as will be described in greater detail below. The enclosure panels 500 are configured to releasably and lockably enclose each vertical side of track-climber 150, as shown in FIGS. 8 and 9. Enclosure panels 500 are preferably held in place using removable fasteners, not shown. The rails 602 may extend from the panels 500 and may be configured to engage the through bore 131*a* on the mount 131 to functionally engage the tracked climber 150 with the adjustable frame 140. Each of the through bores 131*a* may be configured to house a linear bearing therein that helps facilitate the functional communication of the rails 602 with the respective through bore 131*a*. Each rail 602 may be configured to engage a corresponding through bore 131*a*. Moreover, each rail 602 may be configured to slidably engage its corresponding through bore 131*a*, such that the rails 602 may slide back and forth within the corresponding through bore 131*a* but not completely detach, or otherwise disengage, therefrom, unless of course the user 110 manually disengages the rails 602 from within the through bore 131*a*, as needed. The configuration of the rails 602 and the corresponding through bores 131*a* may permit each tracked climber 150 to move toward or away from the columnar object 120 in response to the contours, irregularities, and other variations in the surface of the columnar object 120, as discussed above. Moreover, the configuration of the rails 602 and the corresponding through bores 131*a* may restrict the side-to-side movement of the tracked climber 150 to maintain the track 412 of each tracked climber 150 more or less centered on the columnar object 120, despite the contours, irregularities, and other variations in the surface of the columnar object 120 discussed above.

Embodiments of the tracked climber 150 include the track 412 comprising grips 414, which can be oriented in any direction on the track 412. Embodiments of the tracked climber 150 include the grips 414 being oriented transverse to the direction of motion of the track 412. Alternatively, as depicted, the grips 414 may run parallel with the direction of motion of the track 412. Moreover, embodiments of the tracked climber 150 include the grips 414 being positioned on the track 412 in arbitrary locations and positions, or on the other hand, in a repeated pattern on the track 412. Indeed, the grips 414 may be configured on the track 412 in a continuous or repeated manner or in an arbitrary manner, and the grips 414 may have the same or varying patterns, designs, shapes, profiles, and sizes with respect to one another to facilitate adequate gripping of the track 412 on the columnar object 120. Additionally, the track 412 may be interchangeable from one tracked climber 150 to another by removing one of the panels 500 and removing the track 412. Thus, individual tracks 412 with varying grips 414 can be interchanged in the tracked climber 150 for use in the workstation 100 depending upon the surface characteristics of the columnar object 120 on which the workstation 100 will be used, as determined by the user 110.

Figure 12:
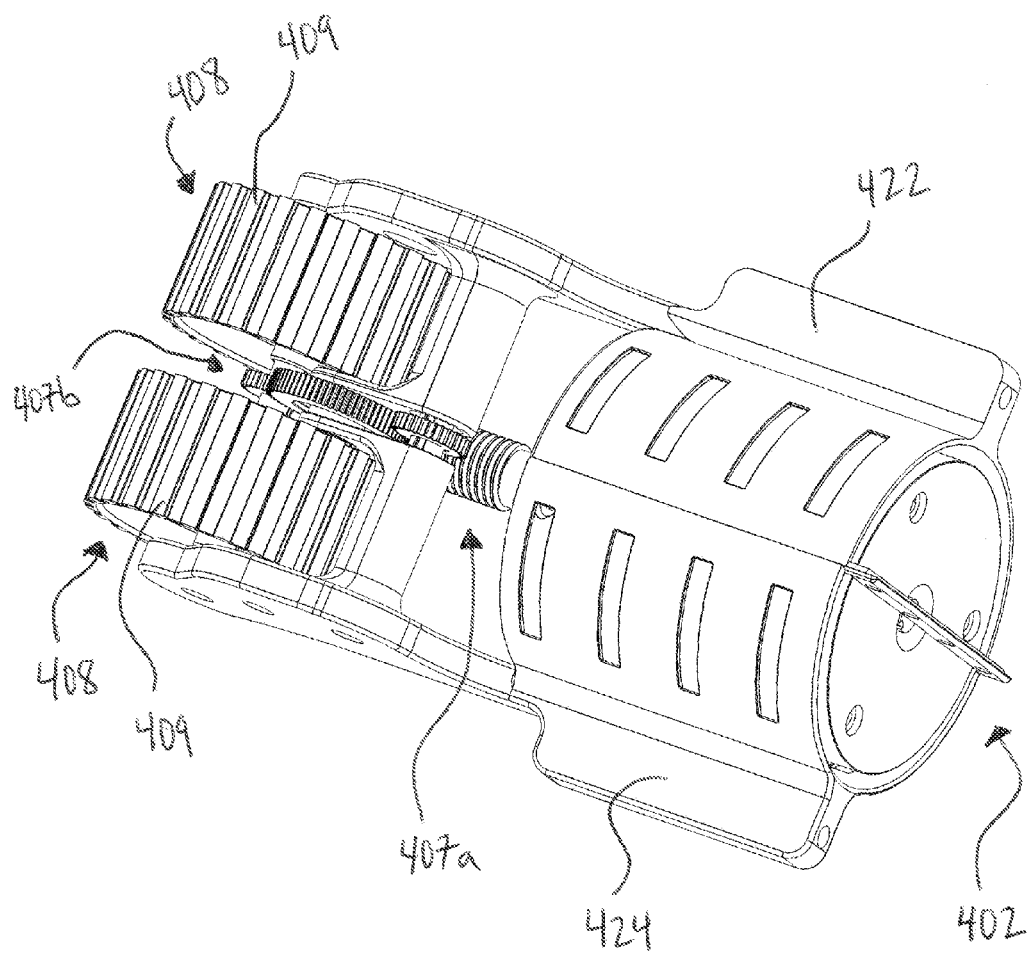
FIG. 12 is a perspective view of components of an embodiment of a workstation in accordance with the present disclosure.
Figure 13:
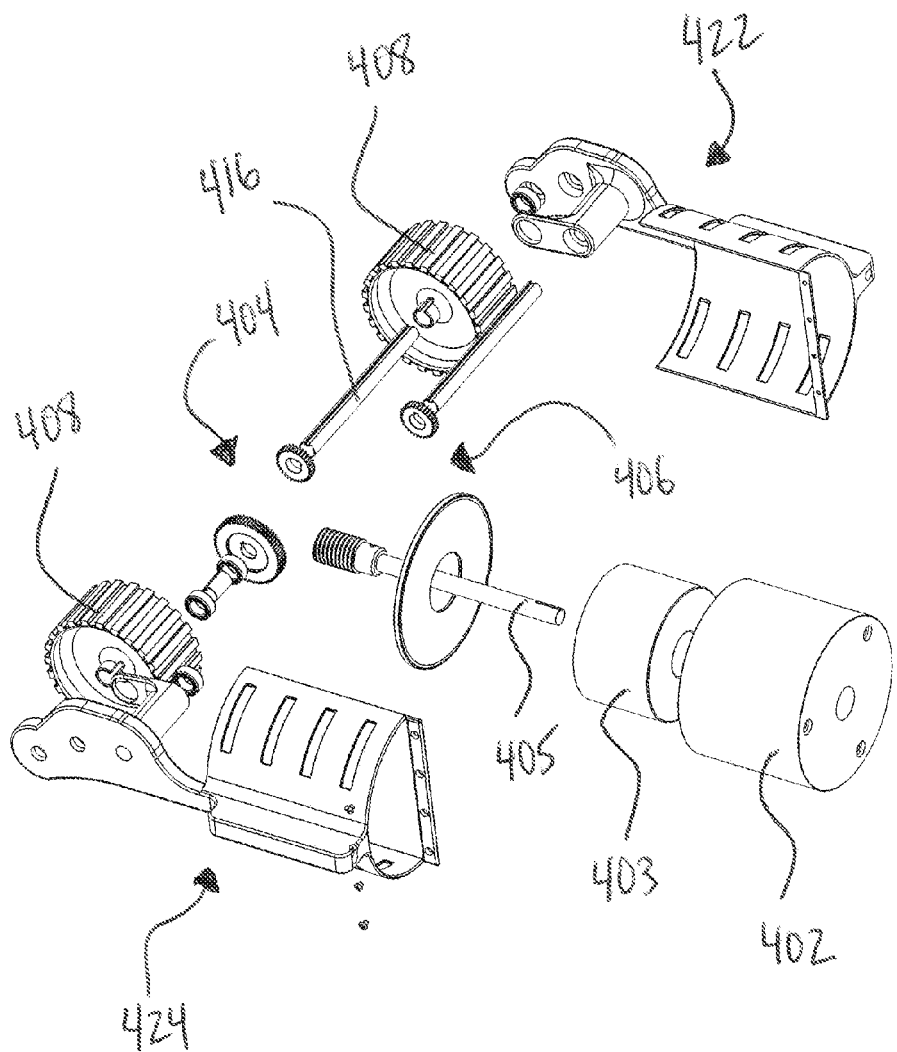
FIG. 13 is an exploded view of components of the embodiment of the workstation depicted in FIG. 12 in accordance with the present disclosure.

As depicted in FIGS. 11-13, embodiments of the workstation 100 include the tracked-climber 150 further comprising a motor 402, a gear set 404, a power pulley 408, and a plurality of idler pulleys 410 housed within the tracked-climber 150 and between opposing enclosure panels 500 (one of which is removed in the embodiment depicted in FIG. 11, so as to expose the inner components of the tracked-climber 150). The motor 402 may be configured to drive a gear shaft 405 that drives the gear set 404. The motor 402 may be configured to drive the gear shaft 405 in a clockwise or counterclockwise rotation, thus controlling the movement of the workstation 100, as described herein. The motor 402 may be AC or DC electrically controlled, hydraulically-controlled, or pneumatically-controlled, depending on preference of user 110, or the desired work application. Under the condition that the motor 402 is electrically controlled, the motor 402 may be powered by on-board batteries 9 or through the wiring harness described herein. The electrical motor 402 may be configured to provide rotational motion to the gear shaft 405, which thus powers the gear set 404, which thus provides rotational motion to the power pulley 408, which thus provides motion to the track 412 to control the movement of the workstation 100, as described herein. As depicted in FIG. 13, the motor 402 may be pneumatically powered and may further comprise an air vane 403 that may be configured within the motor 402 and may be further configured to receive high pressure air therein from the compressor 7 to rotate the air vane 403 to provide rotational motion to the gear shaft 405, which thus powers the gear set 404, which thus provides rotational motion to the power pulley 408, which thus provides motion to the track 412 to control the movement of the workstation 100, as described herein.

The gear set 404 may be configured to comprise one or more gears 406 that transfer rotational motion of the motor 402 to rotational motion of the power pulley 408. The gears 406 may comprise a worm gear set 407*a* and a helical gear set 407*b* that function to communicate rotational motion of the motor 402 to rotational motion of the power pulley 408. The worm gear set 407*a* may be coupled to a distal end of the shaft 405, such that as the shaft 405 rotates, so too does the worm gear set 407*a*. The worm gear set 407*a* may also be in mechanical communication with the helical gear set 407*b*, such that as the worm gear set 407*a* rotates, so too does the helical gear set 407*b*. The helical gear set 407*b* may be in mechanical communication with a pulley drive shaft 416, such that as the helical gear set 407*b* rotates, so too does the pulley drive shaft 416. The pulley drive shaft 416 may be in mechanical communication with the power pulley 408, such that as the pulley drive shaft 416 rotates, so too does the power pulley 408. Thus, the gears 406 function to transfer rotational motion of the motor 402 to rotational motion of the power pulley 408.

Embodiments of the tracked-climber 150 further comprise the motor 402, the gear set 404 and the power pulley 408 being engaged and held in place by a first-side drive carriage 422 and a second-side drive carriage 424 that are configured to secure to one another with the motor 402, the gear set 404, and at least a power pulley 408 being housed therebetween.

The carriages 422 and 424 may be functionally coupled to the tracked-climber 150. In addition, a tension member 426 may be coupled to one or more of the power pulleys 408. The tension member 426 may be configured to maintain the positional relationship between opposing power pulleys 408. The tension member 426 may further be configured to increase or decrease the distance between opposing power pulleys 408 to respectively increase or decrease the tension of the track 412 that travels about the power pulleys 408 and the idler pulleys 410.

The power pulley 408 may be further configured to comprise one or more friction members 409 on the surface thereof, such as ridges or elevations on the outer surface of the power pulley that function to grip the interior surface of the track 412. In this way, the friction members 409 of the power pulley 408 function to enhance the frictional contact between the power pulley 408 and the interior surface of the track 412, such that the rotational movement of the power pulley 408 causes the track 412 to move tangentially in relation to the rotational movement of the power pulley 408 and to the idler pulleys 410. The motor 402 and the gears 406 are configured to drive the track 412 in a clockwise or counterclockwise rotation about the power pulley 408. The resulting rotation of the track 412 and the frictional contact of the track 412 when placed against the columnar object 120 results in the workstation 100 being configured, or otherwise adapted, to ascend or descend the columnar object 120. Further, movement of the workstation 100 with respect to the columnar object 120, i.e., upward or downward movement, is a result of the direction the track 412 is rotated. The configuration of the three drive system in a triangle formation causes the workstation 100 to automatically self-center on columnar objects 120, even when the columnar object 120 may be oriented at any angle with respect to the surface from which the columnar object 120 extends.

The enclosure panels 500 comprise durable and tough material to be reliable in service. The enclosure panels 500 are configured to keep debris out of the interior of tracked-climber 150 to protect the track 412, the motor 402, the gear set 404, the power pulleys 408, the idler pulley 410, and any other interior component from prematurely wearing. The enclosure panels 500 further comprise mounting holes 504, as shown, and bearing seats. The bearing seats are provided to accommodate idler pulleys 410. The profile of the enclosure panels 500 and mounting holes 504 may be changed to permit different sizes and combinations of the tracked-climbers 150 or different sizes and combinations of the powered drive system 130.

Figure 14:
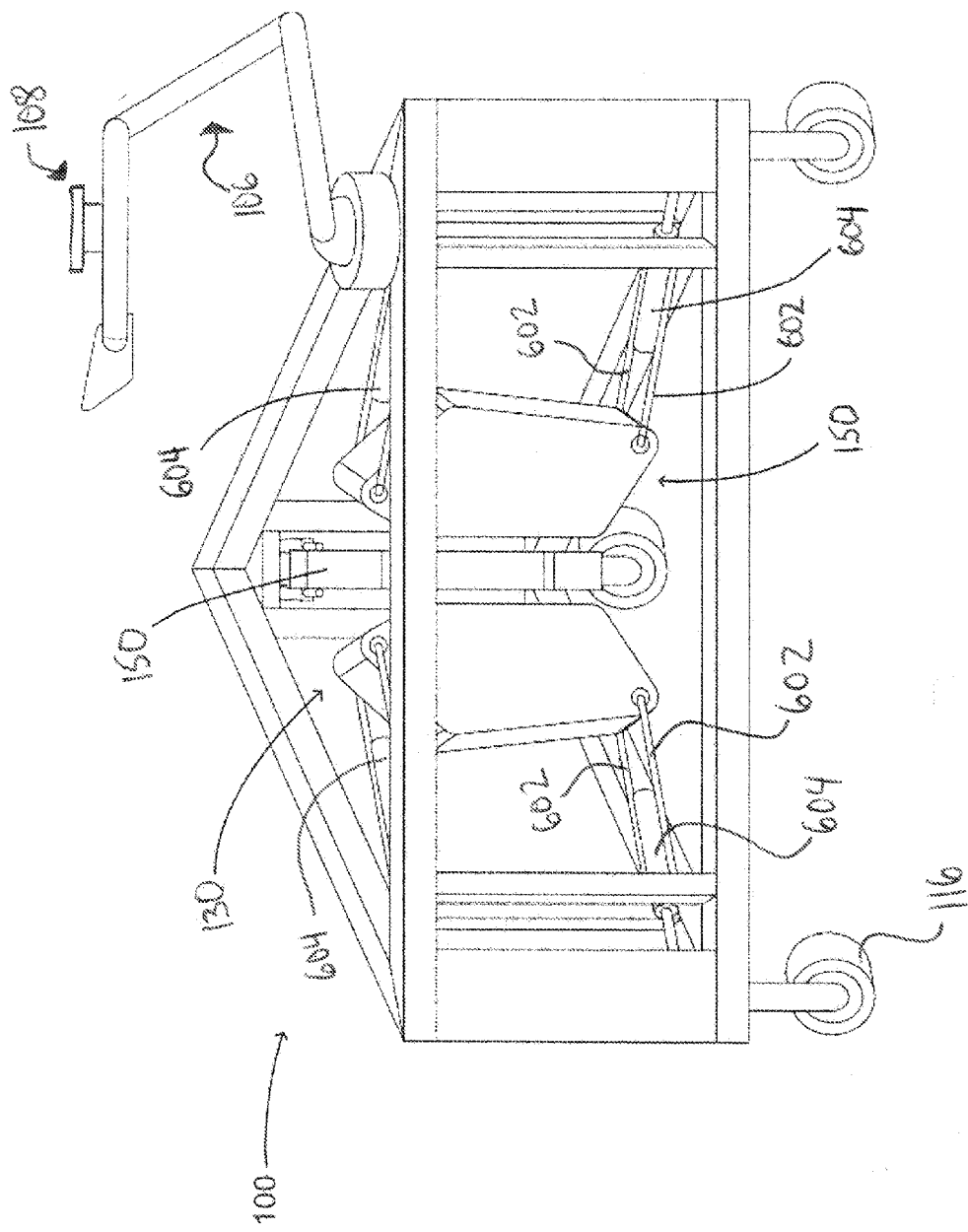
FIG. 14 is a perspective view of components of an embodiment of a workstation in accordance with the present disclosure.

As depicted in FIG. 14, embodiments of the workstation 100 include the adjustable suspension system 160. The adjustable suspension system 160 comprises one or more adjustable linear actuators 604 that can be functionally coupled to the workstation 100 between the adjustable frame 140 and each of the tracked climbers 150. Embodiments of the workstation 100 include the linear actuators 604 being, for example and not by way of limitation, a gas spring shock absorber, or other like shock absorber. The linear actuator 604 may be placed, respectively, between the upper and lower pairs of rails 602 on the tracked climber 150, such that each tracked climber 150 is configured to have one or more linear actuator 604 paired with the upper pair of rails 602 and one or more linear actuator 604 paired with the lower pair of rails 602 to permit the tracked climber 150 to adjust to the contours of the columnar object 120, as needed. In other words, the configuration and placement of the actuators 604 between the tracked climber 150 and the adjustable frame 140 permits the each linear actuator 604 to independently react to the varying contours and irregularities on the surface of the columnar object 120 to keep the respective track 412 of each tracked climber 150 in contact with the columnar object 120 as the workstation 100 ascends or descends the columnar object 120.

The adjustable suspension system 160 secures and manipulates each tracked-climber 150 of powered drive system 130 to accommodate for differences in contours on columnar object 120 while workstation apparatus 100 is ascending on the surface of columnar object 120. As discussed herein, the required pressure is independently exerted on each of the actuators 604 positioned near the upper and lower pairs of rails 602. Or, in other words, each of the actuators 604 exerts the required force and also reacts independently to the surface irregularities of the columnar object 120 to keep the respective track 412 against the columnar object 120 by providing the necessary force against the columnar object 120. Specifically, the actuators 604 press the track 412 against the columnar object near portion 413 of the tracked-climber 150. By configuring the tracked-climber 150 to have the linear actuators 604 positioned between the tracked-climber 150 and the frame 140, each of the tracked-climbers 150 may adjust according to the contours of the columnar object 120. In this way the contact angle and contact area (footprint) of track 412 on tracked-climbers 150 can self-adjust against the surface of the columnar object according to the varying contours of columnar object 120 to keep the portion 413 of the track 412 up against the columnar object 120. Such frictional force exerted by linear actuators 604 on the tracked-climbers 150 causes the track 412 to press against the columnar object 120 to maintain the workstation 100 in a desired position against the object 120. However, as described herein, the force exerted by the linear actuators 604 is not so great as to prevent the tracked-climbers 150 from adjusting in real time to the contours of the columnar object 120. Indeed the linear actuators 604 are configured to move back and forth, in and out, to keep the track 412 of the tracked-climber 150 up against the surface of the columnar object 120. Operation of the track 412 in either direction also causes the workstation 100 to ascend or descend the columnar object 120. Also, the speed of rotation of the track 412 can be adjusted by adjusting the rotational speed of the power pulley 408 via the motor 402, according to user 110 preference and/or preset limits supplied to the motor 402 via the wired or wireless control station operated by the user.

Embodiments of the workstation 100 include a remote control 170 that may be manipulated by user 110 to control the operation of the workstation 100. The remote control 170 may be wired or wireless. With regard to the adjustable suspension system 160, the remote control 170 may be utilized to instruct the system 160 to immediately release, or otherwise retract, from the surface of the columnar object 120 to permit the workstation 100 to rapidly descend down the columnar object 120, and in some cases to free fall from the columnar object 120. Indeed, emergency, non-powered descents are possible with the workstation 100 by allowing the suspension system 160 to be released via the remote control 170.

Embodiments of the workstation 100 include one or more adjustable rotatable wheels 116. As depicted, the workstation 100 may include one or more wheels 116 that swivel, one wheel 116 coupled to each corner of the frame 140, as depicted in FIG. 14. The wheels 116 may be releasable, or otherwise detachable from the workstation 100 once the workstation 100 is secured to the columnar object 120 and may be recoupled to the workstation 100 when preparing to move the workstation to another location or to another columnar object 120. Other suitable rotatable mechanisms such as casters may also be used. The wheels 116 may be adjusted vertically to level the workstation apparatus 100, as well as provide a means to easily move and position the workstation apparatus 100 when on the ground 102.

Embodiments of the workstation 100 include a mounting surface 112 on adjustable frame 140, as depicted in FIG. 1, adapted to secure at least one semi-robotic arm 106 which may further comprise at least one camera 108 mounted thereon. The camera(s) 108 may be configured to be wired or wireless. The camera 108 preferably uses virtual reality feedback, thus providing the user 110 the ability to position the robotic arm 106 in real-time. Each camera 108 may be configured to send the views to both a virtual reality type of head gear worn by the operator and also to a monitor mounted and sized appropriately to the operator's remote control station.

The camera 108 can be used to allow user 110 to view and potentially visually record the work that is performed by the robotic arm 106, in both semi-robotic and robotic states of the arm, because the operator directly controls the arm via wireless or wired remote control station with a joystick and/or other switches as various job applications require the direct control by the operator.

Camera 108 may be wired or wireless, and camera 108 may be powered by on-board batteries 9 or through the wiring harness described herein. As mentioned herein, embodiments of the workstation 100 include brackets 149 on corner sections 145 that may be configured to receive and releasably couple thereto an arm base 107 that may be configured to receive and releasably couple thereto the semi-robotic arm 106, as discussed herein.

The semi-robotic arm 106 may be mounted on workstation apparatus 100, as depicted in FIGS. 1-3 and 15. The semi-robotic arm 106 may be operated by the user 110 using a wired or wireless version of the remote control 170. Additionally, at least one camera 108 may be operated in embodiments of the present disclosure and may be mounted to semi-robotic arm 106 using camera mounting bracket 308, as depicted. The camera 108 can be used to allow the user 110 to view the work being performed by the camera 108 transmitting images and/or video in real time to a monitor or screen (not shown), such that the user 110 can view the images and/or video. The camera 108 can also visually record any work done by the semi-robotic arm 106 in real-time. Moreover, the camera 108 may also be configured to transmit digital data, either wirelessly or through wires, to a remote viewing device, such as a smart phone or other similar device, or to a hard drive or memory storage device positioned either on the workstation 100 or remotely therefrom.

Figure 15:
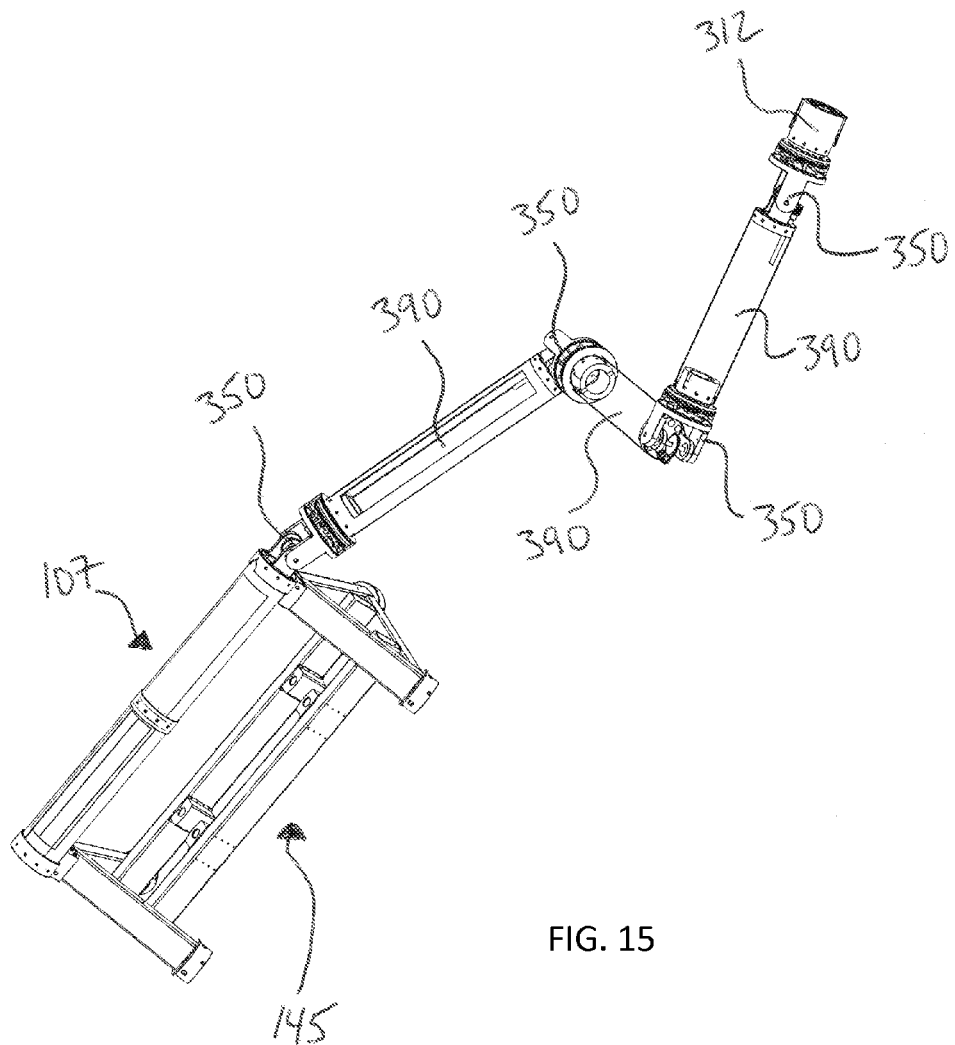
FIG. 15 is a perspective view of components of an embodiment of a workstation in accordance with the present disclosure.
Figure 16:
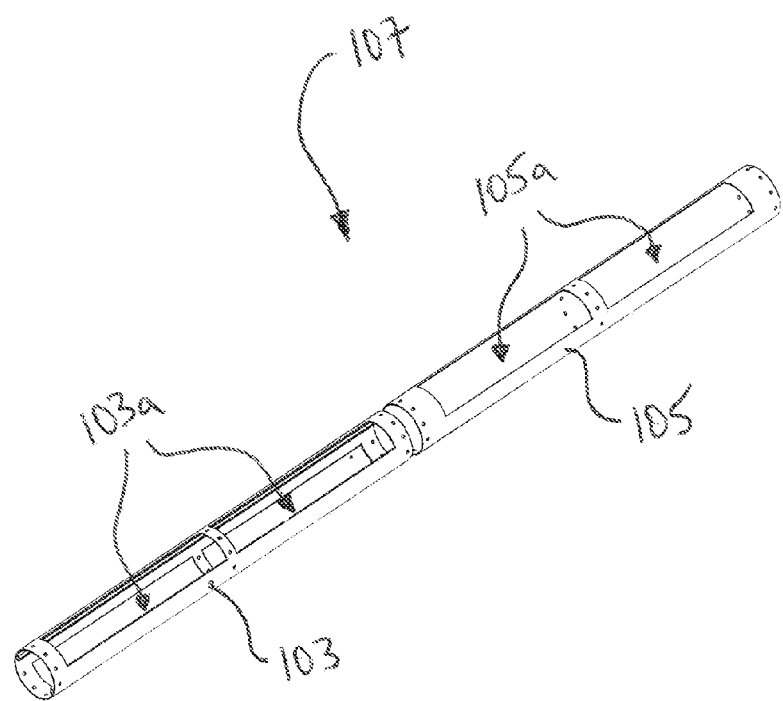
FIG. 16 is an exploded perspective view of components of the embodiment of the workstation depicted in FIG. 15 in accordance with the present disclosure.

As depicted in FIGS. 1-3, 15 and 16, embodiments of the workstation 100 include the semi-robotic arm 106 being mounted to workstation apparatus 100. As depicted in FIG. 15, embodiments of the workstation 100 include the arm 106 being releasably coupled to the workstation 100 through engagement of the arm base 107 with the bracket 149. Embodiments of the workstation 100 include the arm base 107 further comprising a tube 103 and a tube casing 105, the tube casing 105 being configured to slidably and rotationally engage the tube 103. The tube 103 may be configured to be hollow and may also be configured to have sidewall openings 103a therein, to provide access to the hollow interior space of the tube 103. The sidewall openings 103a may be on either side of the tube 103, such that the tube 103 has several sidewall openings 103a therein, some of the sidewall openings 103a being on opposite sides of the tube 103, whereas other sidewall openings 103a are arranged in parallel with one another along an axial length of the tube 103. Similarly, the casing 105 may be configured to be hollow and may also be configured to have sidewall openings 105a therein, to provide access to the hollow interior space of the casing 105. The sidewall openings 105a may be on either side of the casing 105, such that the casing 105 has several sidewall openings 105a therein, some of the sidewall openings 105a being on opposite sides of the casing 105, whereas other sidewall openings 105a are arranged in parallel with one another along an axial length of the tube 105, as depicted in FIG. 16. Because the tube 103 and the casing 105 are hollow, components of the workstation 100 may be stored therein, such as, for example, and not by way of limitation, the on-board battery 9, the air tank, the air compressor 7, the computer system, and other workstation components. From this position within the arm base 107, these components may functionally communicate with their respective components located on other portions of the workstation 100, such as, for example, the air compressor 7 communicating through the air valve 141d and through the air line 141c with the frame expansion housing 142 and a corresponding frame expansion rod 143, as described herein. Additionally, because the casing 105 is rotatable with respect to the tube 103, the user 110 may rotate the casing 105 to align the sidewall openings 105a with the sidewall openings 103a of the tube 103 to access the interior of the tube 103 and the workstation components housed therein to repair, monitor, upgrade, and/or replace, as needed, these components. The tube 103 and the tube casing 105 may be manufactured of lightweight and sturdy materials, such as, for example, lightweight metals, plastics, and polymers, such as carbon fiber.

Figure 17:
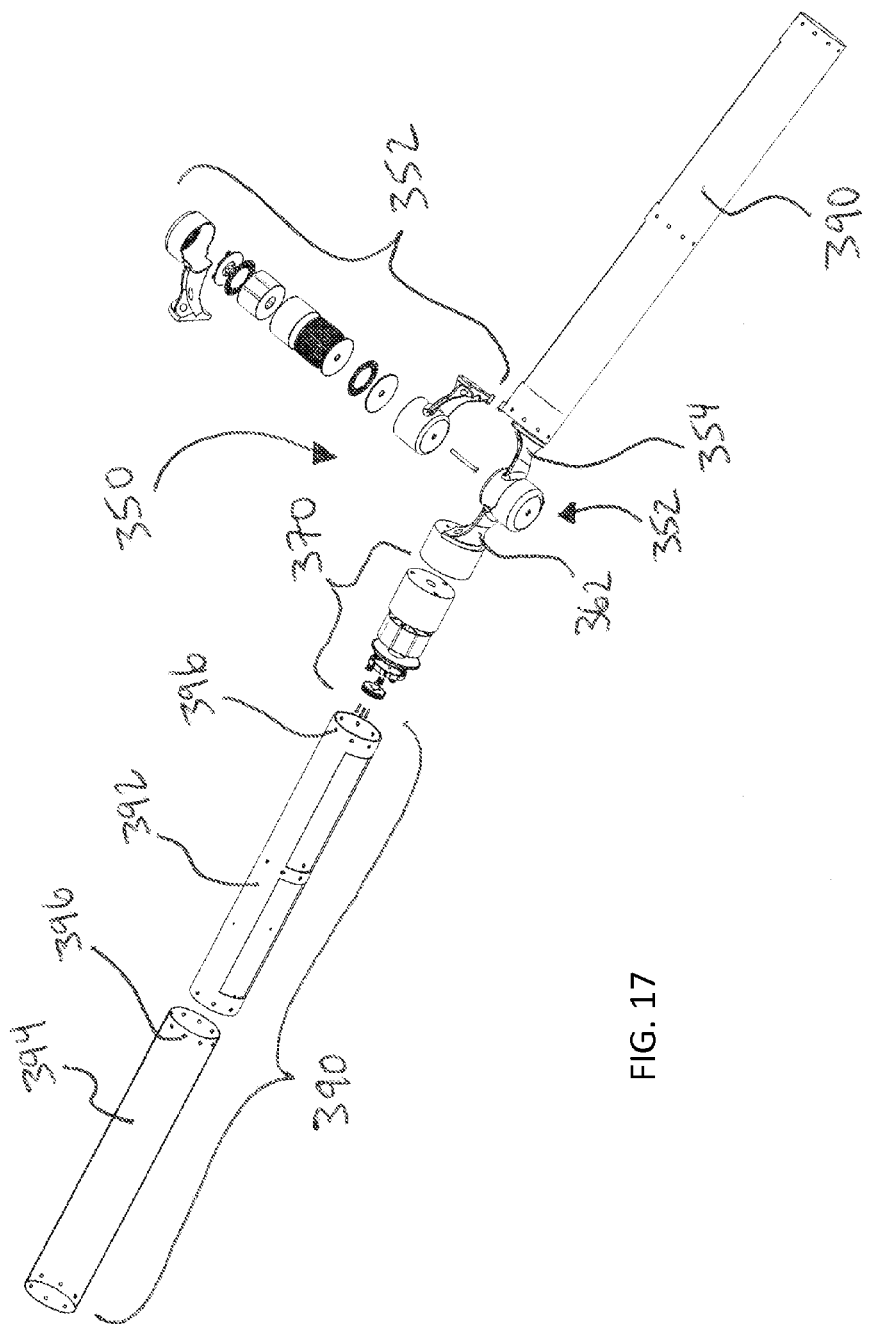
FIG. 17 is an exploded perspective view of components of an embodiment of a workstation in accordance with the present disclosure.

Referring to FIGS. 15 and 17, embodiments of the workstation 100 include the arm 106 further comprising one or more appendages 390, one or more joints 350, the arm base 107 described herein, and a tool holder 312. The appendages 390 may further comprise an inner tube member 392 and an outer casing 394 that may be configured to slidably engage the inner tube member 392. Embodiments of the workstation 100 include the outer casing 394 completely covering the inner tube member 392. The inner tube member 392 may be hollow to provide an interior space for housing therein wiring components, compressed air lines, and/or other components, including a rotation assembly 370 to be described herein. The inner tube member 392 may have sidewall openings 392a therein to provide access to the hollow interior. The inner tube member 392 and the outer casing 394 may be manufactured of lightweight and sturdy materials, such as, for example, light-weight metals, plastics, and polymers, such as carbon fiber.

Referring still to FIGS. 15 and 17, embodiments of the workstation 100 include the joints 350 being configured between each consecutive appendage 390, between the arm base 107 and an appendage 390, and between an appendage 390 and the tool holder 312. Each of the joints 350 may further comprise one or both of a pivot assembly 352 and a rotation assembly 370. The pivot assembly 352 may be configured to provide pivoting motion to the joint 350, whereas the rotation assembly 370 may be configured to provide rotational motion to the joint 350. Each joint 350 may have one or more pivot assemblies 352 or one or more rotational assemblies 370.

Figure 18:
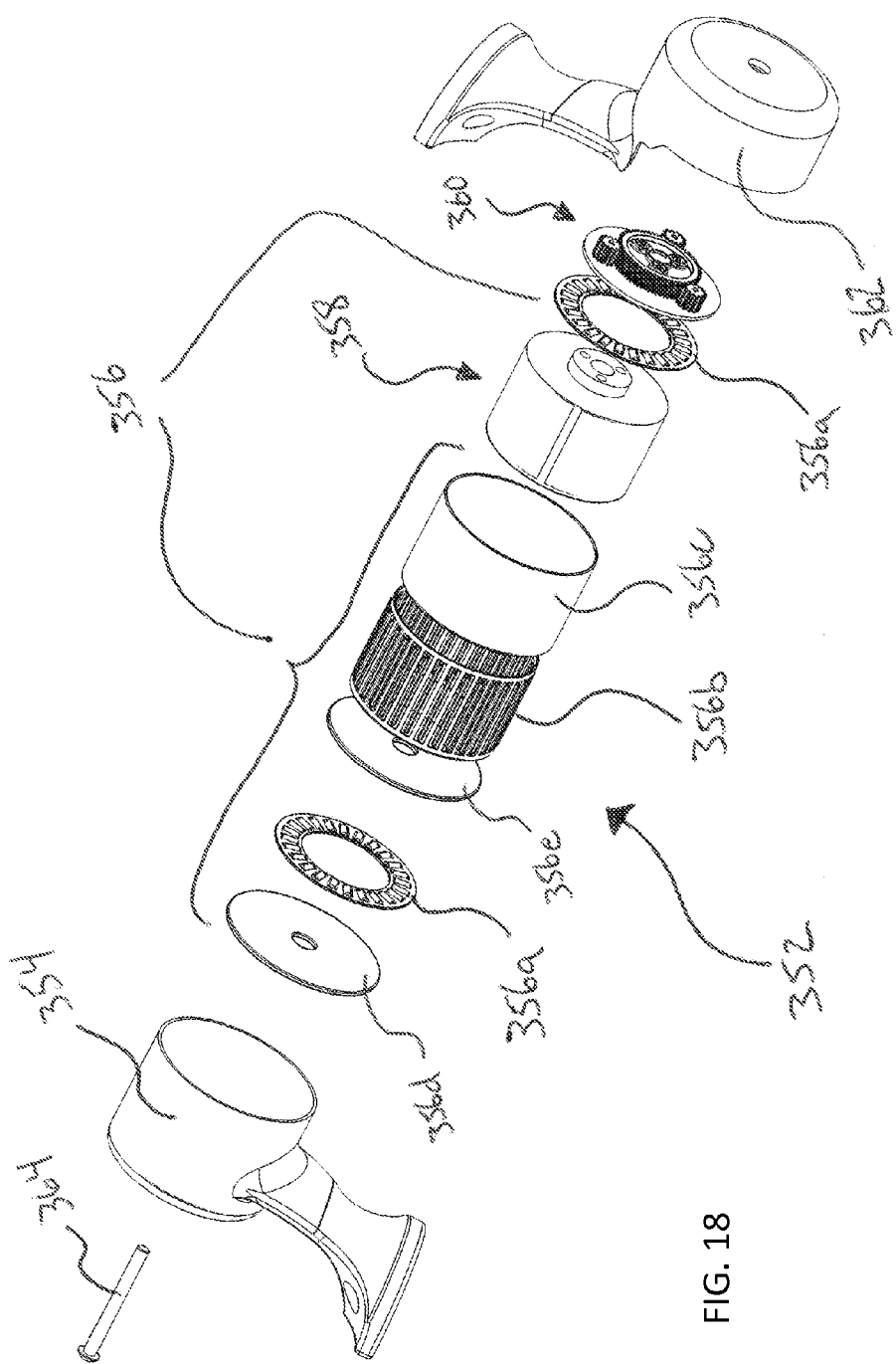
FIG. 18 is an exploded perspective view of components of the embodiment of the workstation depicted in FIG. 17 in accordance with the present disclosure.

As depicted in FIG. 18, embodiments of the workstation 100 may further comprise a pivot assembly 352. The pivot assembly 352 may further comprise opposing braces 354 and 362 that may be configured to engage one another with the remaining pivot assembly 352 components housed therebetween. The braces 354 and 362 are releasably coupled to their respective appendages 390, such that one appendage 390 is releasably coupled to the brace 354 and another appendage 390 is coupled to the brace 362, as depicted in FIG. 17.

Referring again to FIG. 18, the pivot assembly 352 may further comprise a bearing assembly 356, a motor 358, and gears 360. The bearing assembly 356, the motor 358, and the gears 360 may be aligned along a common axis of rotation defined by a pin 364 that also functions to secure the pivot assembly 352 together. The bearing assembly 356, the motor 358, and the gears 360 may be configured about the axis defined by the axis of the pin 364. The motor 358 may provide rotational motion to the pivot assembly 352 by way of the gears 360. The motor 358 may be electrically powered, pneumatically powered, or hydraulically powered. As depicted, the motor 358 is a pneumatically powered motor that further comprises air vanes therein that are configured to receive compressed air and translate the flow of the compressed air into rotational force. This rotational force is then transferred to the gears 360. Once the rotational motion provided by the motor 358, whether electrically, pneumatically, or hydraulically produced, arrives at the gears 360, the gears 360 transfer this rotational motion to one of the braces 354 or 362, such that one of these braces 354 and 362 rotates with respect to the other to cause the joint 350 to pivot in a range of at least 180 degrees. The bearing assembly 356 functions to facilitate the rotation of the braces 354 and 362 with respect to one another. The bearing assembly 356 may comprise one or more thrust bearings 356a and a needle bearing configuration 356b. One thrust bearing 356a may be positioned between the motor 358 and the gears 360. Another thrust bearing 356a may be positioned between a plate 356d housed against the brace 354 and a cap 356e that is configured to cap the needle bearing 356a within a needle bearing housing 356c such that the needle bearing 356a resides within the needle bearing housing 356c. The needle bearing 356b may communicate with the needle bearing housing 356c and the motor 358. In certain embodiments, the needle bearing 356b may reside between the needle bearing housing 356c and the motor 358.

Figure 19:
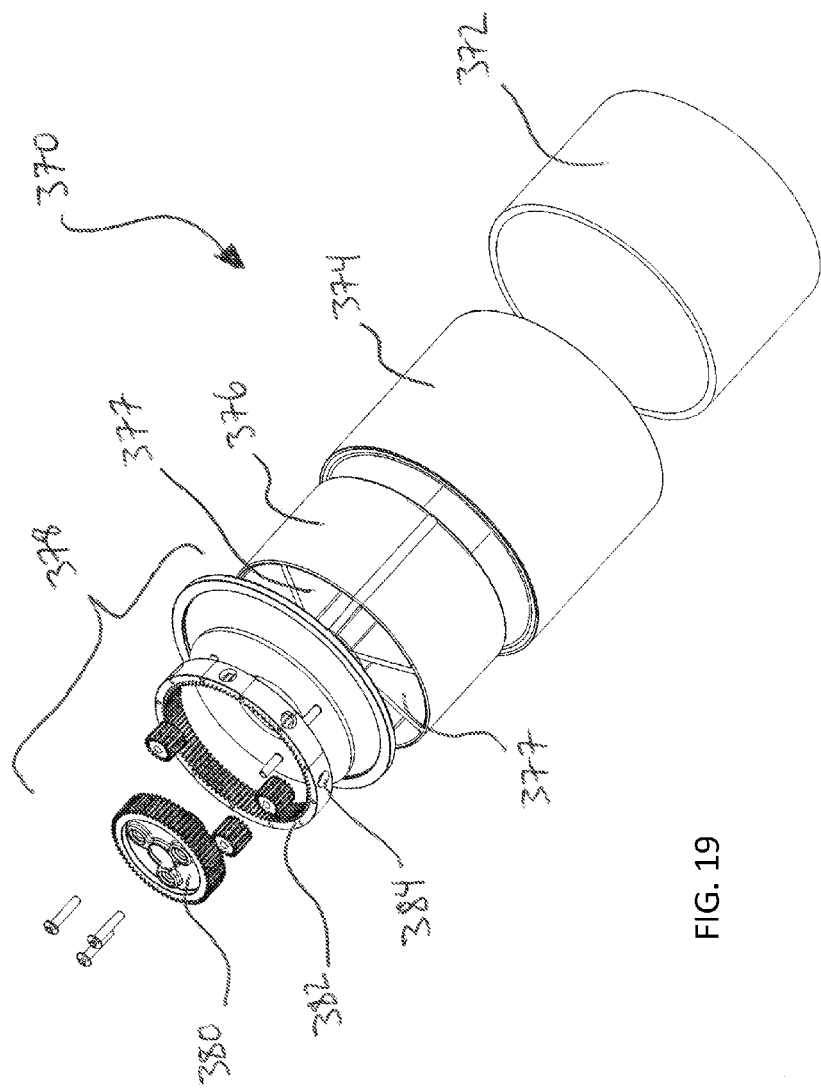
FIG. 19 is an exploded perspective view of components of the embodiment of the workstation depicted in FIG. 17 in accordance with the present disclosure.

As depicted in FIG. 19, embodiments of the workstation 100 may further comprise a rotation assembly 370. The rotation assembly 370 may further comprise a base 372, a motor housing 374, a motor 376, and a planetary gear set 378. The base 372 may be configured to releasably couple to the brace 362. The base 372 may also be configured to engage the motor housing 374. The motor housing 374 may be configured to house the motor 376. The motor 376 may provide rotational force to the rotation assembly 370. The motor 376 may be electrically powered, pneumatically powered, or hydraulically powered. As depicted, the motor 376 is a pneumatically powered motor that further comprises air vanes 377 therein that are configured to receive compressed air and translate the flow of the compressed air into rotational force. The resulting rotational force of the motor 376 is transferred to the planetary gear set 378 to drive the central gear 380. The central gear 380 thereafter drives the outer gear 382 through the relationship of the outer gear 382 and the central gear 380 in the planetary gear set 378. The outer gear 382 may be configured with bores 384 that are configured to correspond to the openings 396 in both the tube 392 and the casing 394, such that the appendage 390 may be releasably coupled to the bores 384 of the outer gear 382. Accordingly, as the outer gear 382 rotates with respect to the central gear 380 that is driven by the motor 376, the appendage 390 likewise rotates. The central gear 380 may be configured to rotate at least 360 degrees in a clockwise or counterclockwise rotation, thus causing the outer gear 382 to rotate in a corresponding manner, in either a clockwise or counterclockwise rotation. In this way, each appendage 390 is configured to rotate through 360 degrees, as needed.

Combining the pivoting rotation provided by the configuration of the pivot joint 352 and the rotational motion provided by the configuration of the rotation joint 370, each joint 350 may provide pivoting motion of 180 degrees in either a clockwise or counterclockwise direction and may provide rotational motion through 360 degrees in either a clockwise or counterclockwise direction. Moreover, each rotation joint 370 and each pivot joint 352 of each joint 350 may be independently controlled by the user 110 via the control unit 8 and the controller 170, such that the arm 106 may be positioned in any number of positions, configurations, and orientations.

Figure 20:
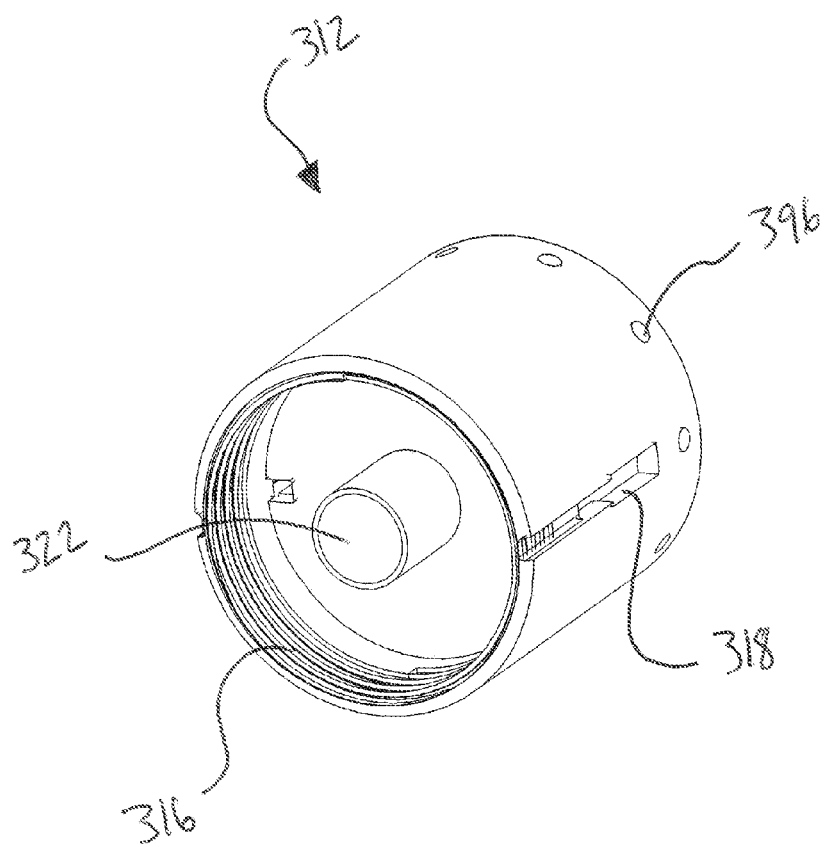
FIG. 20 is a perspective view of components of an embodiment of a workstation in accordance with the present disclosure.

As depicted in FIG. 20, embodiments of the workstation 100 further comprise a tool holder 312. The tool holder 312 may comprise an engagement member 316, a safety lock mechanism 318, and an access port 322. The tool holder 312 may be configured to releasably and repeatedly couple thereto tools (not shown), such as, for example, saws, blades, shears, grippers, clippers, and other tools needed to trim, cut, or otherwise administer pruning to, tree limbs and other portions of trees. The tool holder 312 may comprise an engagement member 316 that may be configured to functionally engage the tools coupled to the tool holder 312. In this way, the various tools that are to be coupled to the tool holder 312 may be engaged by the tool holder 312 via the engagement member 316. As depicted, the engagement member 316 may be threads that correspond to threads on the tools to be attached to the tool holder 312.

Additionally, the tool holder 312 may further comprise a safety lock mechanism 318. The safety lock mechanism 318 may be configured to receive pins (not shown) on the tools to be coupled to the tool holder 312. The safety lock mechanism 318 may be configured to have a slit 319 in the sidewall of the tool holder 312. The slit 319 may be configured to receive and functionally engage the corresponding pins of the tools to be coupled to the tool holder 312. The safety lock mechanism 318 may serve as additional coupling of the tool to the tool holder 312, in addition to the coupling of the tool to the tool holder 312 via the mechanical engagement of the engagement member 316. The configuration of the tool holder 312 and the semi-robotic arm 106 permits the tool that is coupled to the tool holder 312 to reach into and access difficult spots, positions, angles, crevices, and other like parts of the columnar object 120, to perform various tasks while in those spots, including, but not limited to, the tasks of pruning, shearing, clipping, etc.

Additionally, the tool holder 312 may comprise an access port 322 that provides access for cables, electric cables, pneumatic air lines, and other power lines or communication lines through the tool holder 312 to power the tool. The tool that is to be coupled to the tool holder 312 may require power and/or communication with the control unit 8, the compressor 7, or the battery 9, as needed, to function properly. These cables, lines, or other similar components may be fed from their respective sources, usually found in the arm base 107, through the joints 350 and hollow appendages 390 of the arm 106 up through the tool holder 312 and to the tool. Moreover, these lines can communicate with any of the components of the arm 106 as these lines travel up to the tool in the tool holder 312. For example, compressed air from the compressor 7 in the arm base 107 may be fed up through the appendages of the arm 106 to each of the joints 350 to drive the motors 358 and 376, as well as drive the operation of the tool. Similarly, electrical wires from the on-board battery 9 may be fed in a similar manner to provide power to the joints 350, if the motors 358 and 376 are electric motors, and to provide power to the camera 108 and the tool in the tool holder 312.

The semi-robotic arm 106 may further comprise the following components: sensors, dust seal(s), bearing(s), attachment sleeve(s), appropriate gearing, thrust bearing(s), motor(s), motor securing bracket(s) and other suitable parts to enable the semi-robotic arm 106 to rotate along a plurality of axis at its various joints. Sensors may be included within the joints 350 of the semi-robotic arm 106 to provide feedback of the position of each appendage 390 to the user 110. It should be noted that the specific semi-robotic arm 106, as shown and described in the present figure, is not intended to be limited to the various combinations, configurations and uses disclosed herein. It should be realized that other equivalent means to achieve the same purpose may be employed to perform the same or similar task(s).

In accordance with the description herein, the workstation apparatus 100 is very versatile and may be used for assisting in tasks ranging from de-limbing of the tree 122 and/or working to service the utility wire 224 on the utility pole 222 or other such tall columnar objects 120 that may be difficult and dangerous to reach. In this way workstation apparatus 100 is designed to essentially remove the user 110 from the danger of working in hazardous environments such as next to the utility wires 224 and at dangerous heights above the ground 102, thereby enabling the tasks to be performed from a safe distance. Workstation apparatus 100 may be used to readily perform a range of tasks from trimming or de-limbing as previously mentioned to disconnecting and/or reconnecting the utility wire 224 as shown in FIGS. 1 and 2.

Figure 21:
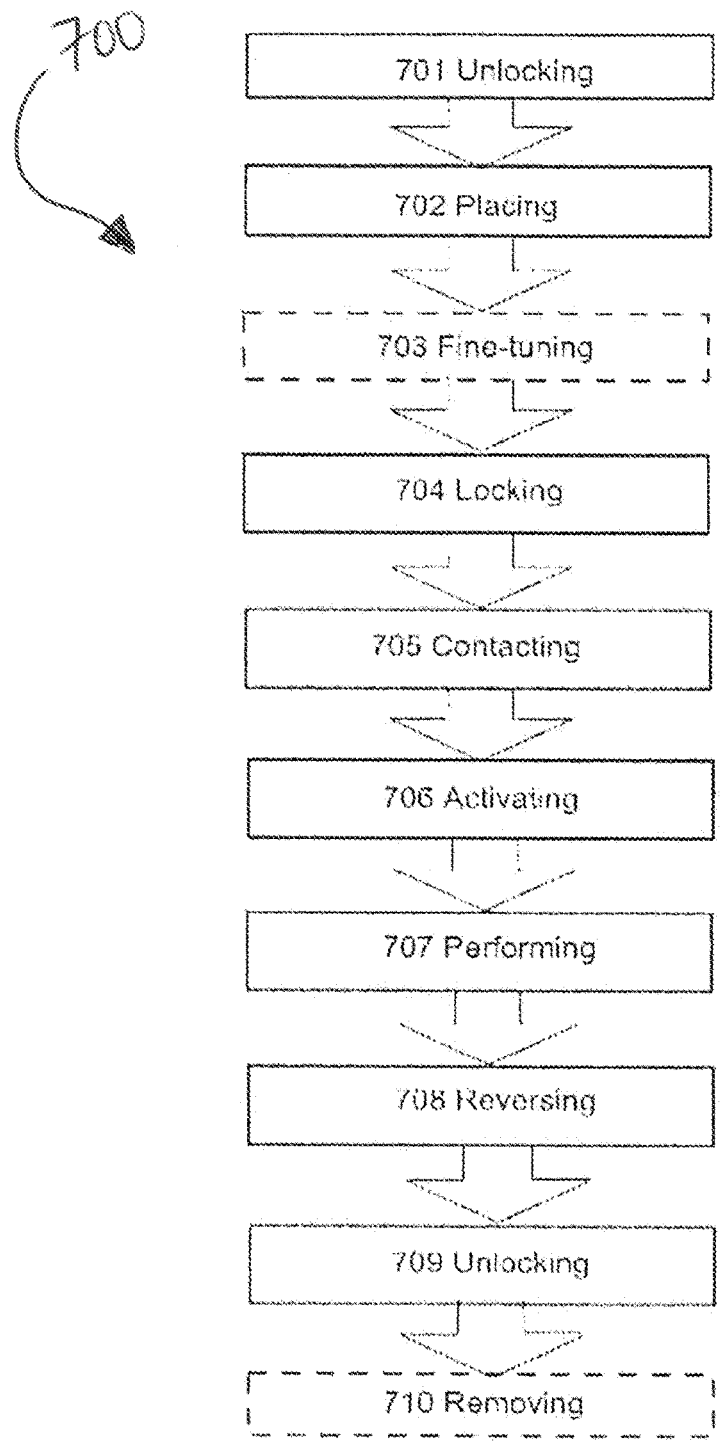
FIG. 21 is a schematic view of a method of using embodiments of the workstation in accordance with the present disclosure.

Referring to FIG. 21, a method of use 700 is depicted according to an embodiment of the workstation 100. The method comprises unlocking the adjustable frame of workstation apparatus 701; placing workstation apparatus around columnar object 702, as shown in FIG. 1; fine-tune positioning workstation apparatus using rotatable wheels 703. It should be noted that step 703 is an optional step and may not be implemented in all cases. Other optional steps of method 700 are also illustrated using dotted lines in FIG. 21 so as to distinguish them from the other steps of method 700.

The method further comprises locking adjustable frame of workstation apparatus 704. Such locking can occur by activating the compressor 7 to flow high pressure air into the adjustable rails 139 to fix the adjustable rails 139 in place, such that the adjustable frame 140 is fixed, or otherwise locked, into position. The method further comprises bringing the tracked-climbers of the powered drive system into contact with the columnar object 705; activating tracks of said track-climbers in a forward motion allowing workstation apparatus to ascend columnar object 706; locking workstation apparatus in place and performing the desired tasks on columnar object using semi-robotic arm and camera(s) 707; reversing power to the tracks to allow workstation apparatus to descend columnar object 708; unlocking adjustable frame 709; and removing workstation apparatus from around columnar object 710.

Additional or clarifying method steps include the following: placing the workstation apparatus around a columnar object, bringing tracked-climbers of a powered drive system into contact with the columnar object using a remote control, activating tracks of the tracked-climbers to control ascension and decent of the workstation with respect to the columnar object, and performing tasks on the columnar object.

The method of use for the vertical climbing workstation apparatus 100 further includes, removing an adjustable rail from a frame of the workstation apparatus to place the workstation apparatus around the columnar object, replacing the adjustable rail in the frame after the workstation apparatus has been placed around the columnar object, adjusting the adjustable rail to expand or contract the frame, operating the tracked-climbers by remote control to control the ascension and decent of the workstation apparatus on the columnar object, performing tasks on the columnar object using a semi-robotic arm having a tool and a camera attached thereto, retracting the tracks from the columnar object to allow the workstation to descend rapidly from the columnar object, operating the tracked-climbers to control the descent of the columnar object until the columnar object reaches a ground surface, removing the adjustable rail to remove the workstation apparatus from around the columnar object, and removing the workstation from around the columnar object. Retracting the tracks from the columnar object may further comprise reducing the pressure of the actuators for a controlled descent along the columnar object, whereas in emergency situations the full depressurization of the actuators allows the workstation to freefall or rapidly descend the object to which it is attached.

It should be noted that the steps described in the method of use can be carried out in many different orders according to user preference. Upon reading this specification, those with ordinary skill in the art will now appreciate that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may suffice.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A vertical climbing workstation apparatus comprising:
   an adjustable frame having a plurality of adjustable rails and a plurality of corner sections, each corner section of the plurality of corner sections respectively comprising vertical support beams, horizontal support beams, and at least two adjustable rails of the plurality of adjustable rails respectively connected between neighboring corner sections of the plurality of corner sections, and each of the at least two adjustable rails respectively configured to expand and contract to adjust dimensions of the adjustable frame;
   a powered drive system functionally coupled to the frame, the powered drive system having a plurality of tracked-climbers configured to engage and climb a columnar object therebetween; and
   a suspension system functionally coupled between the powered drive system and the adjustable frame, the suspension system comprising at least two linear actuators coupled to each respective tracked-climber of said plurality of tracked-climbers, wherein a first linear actuator of the at least two linear actuators is coupled to an upper portion of each said respective tracked-climber and a second linear actuator of the at least two linear actuators is coupled to a bottom portion of each said respective tracked-climber, wherein the first and second linear actuators are configured to operate independently from each other to adjust a positional relationship between each said respective tracked-climber and the adjustable frame to independently exert force between the powered drive system and the adjustable frame to maintain engagement between each said respective tracked climber and the columnar object, wherein the first and second linear actuators are further configured to independently react to the varying contours and irregularities on the columnar object to keep each respective track of the plurality of tracked-climbers in contact with the columnar object as the vertical workstation apparatus ascends or descends the columnar object, wherein when the powered drive system is operated, the workstation apparatus moves along and with respect to the columnar object.

2. The workstation apparatus of claim 1, wherein the columnar object has one end thereof embedded in a surface and an opposing end thereof that extends from the surface, and wherein the workstation apparatus is adapted to travel in a direction parallel with an axis of the columnar object.

3. The workstation apparatus of claim 1, wherein at least two linear actuators are adjustable for length in real time during use.

4. The workstation apparatus of claim 1, wherein the frame is configured to removably surround the columnar object and wherein the frame is configured to be offset from the columnar object, and wherein the powered drive system engages the columnar object.

5. The workstation apparatus of claim 1, wherein each of the linear actuator is pneumatic and is configured to move in a direction substantially orthogonal to an axis of the columnar object.

6. The workstation apparatus of claim 1, wherein the suspension system is retractable to release the powered drive system from the columnar object to allow descent of the workstation apparatus from the columnar object.

7. The workstation apparatus of claim 1, wherein the workstation apparatus is operable by wired or wireless remote control.

8. The workstation apparatus of claim 1, further comprising a mechanical arm, the mechanical arm releasably coupled to the frame and the mechanical arm comprising more than one appendage functionally coupled together in succession by a joint.

9. The workstation apparatus of claim 8, the joint further comprising a pivot assembly and a rotation assembly, wherein the pivot assembly is capable of providing pivoting motion between successive appendages with respect to one another and wherein the rotation assembly is capable of providing rotational motion between successive appendages with respect to one another.

10. The workstation apparatus of claim 8, the mechanical arm further comprising a tool holder for engaging a tool.

11. The workstation apparatus of claim 10, the mechanical arm further comprising a camera for observing the tool.

12. The workstation apparatus of claim 11, each said respective tracked-climber of said plurality of tracked-climbers further comprising:

a motor;

a gear set functionally engaged by the motor;

a power pulley functionally engaged by the gear set; and said respective track functionally engaged by the power pulley, the track being configured to engage the columnar object;

wherein when in use, operation of the motor results in the track transitioning about the power pulley to cause the workstation apparatus to ascend or descend the columnar object.

13. The workstation apparatus of claim 12, wherein the motor is pneumatically, hydraulically, or electrically controlled.

14. The workstation apparatus of claim 12, wherein each of the tracked-climbers further comprises a tensioning member that is adapted to adjust a tension of the track.

15. The workstation apparatus of claim 1, further comprising a mechanical arm, the mechanical arm releasably coupled to the frame and the mechanical arm comprising one or more appendages functionally coupled together in succession by a joint therebetween, the joint further comprising a pivot assembly and a rotation assembly, wherein the pivot assembly is capable of providing pivoting motion between successive appendages with respect to one another and wherein the rotation assembly is capable of providing rotational motion between successive appendages with respect to one another.

\* \* \* \* \*